United States Patent
Nakazawa et al.

(10) Patent No.: US 7,796,584 B2
(45) Date of Patent: Sep. 14, 2010

(54) METHOD FOR CONNECTION BETWEEN COMMUNICATION NETWORKS OF DIFFERENT TYPES AND GATEWAY APPARATUS

(75) Inventors: Tatsuya Nakazawa, Tokyo (JP); Atsushi Murashima, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1184 days.

(21) Appl. No.: 10/573,754

(22) PCT Filed: Sep. 8, 2004

(86) PCT No.: PCT/JP2004/013022

§ 371 (c)(1),
(2), (4) Date: Mar. 29, 2006

(87) PCT Pub. No.: WO2005/034447

PCT Pub. Date: Apr. 14, 2005

(65) Prior Publication Data

US 2007/0136494 A1    Jun. 14, 2007

(30) Foreign Application Priority Data

Sep. 30, 2003   (JP)  ............................. 2003-340532

(51) Int. Cl.
*H04L 12/66* (2006.01)
*H04L 12/28* (2006.01)
*G01R 31/08* (2006.01)

(52) U.S. Cl. .................... 370/353; 370/217; 370/401

(58) Field of Classification Search ................ 370/351, 370/352, 353, 389, 400, 401, 216, 217; 455/73, 455/550.1, 560

See application file for complete search history.

(56) References Cited

U.S. PATENT DOCUMENTS

| 5,873,058 | A | 2/1999 | Yajima et al. |
| 5,907,822 | A * | 5/1999 | Prieto, Jr. ..................... 704/202 |
| 6,504,838 | B1 | 1/2003 | Kwan |
| 6,574,218 | B1 * | 6/2003 | Cooklev ..................... 370/352 |
| 6,751,477 | B1 * | 6/2004 | Alperovich et al. ......... 455/560 |
| 6,973,024 | B1 * | 12/2005 | Joseph et al. ................ 370/217 |
| 2002/0141392 | A1 | 10/2002 | Tezuka et al. |
| 2003/0053463 | A1 | 3/2003 | Vikberg et al. |

(Continued)

FOREIGN PATENT DOCUMENTS

JP   1-220552   9/1989

(Continued)

*Primary Examiner*—Ricky Ngo
*Assistant Examiner*—Paul Masur
(74) *Attorney, Agent, or Firm*—Foley & Lardner LLP

(57) ABSTRACT

A gateway apparatus for conducting connection between different types of communication networks, that are a line-switched network and a packet-switched network, there are provided a method and an apparatus in which sound breaks otherwise caused by delay or loss of speech encoded data is eliminated and deterioration of the speech quality is minimized to assure short delay in speech communication. A speech data processing circuit of the gateway apparatus compares the number of speech encoded data actually acquired with an expected value. The speech data processing circuit packetizes the so generated speech encoded data, along with the speech encoded data, to send the packetized data from a transmission circuit to the packet-switched network. The resulting data is sent from a data multiplexing circuit and a line-switched network terminating circuit to the line-switched network.

16 Claims, 12 Drawing Sheets

U.S. PATENT DOCUMENTS

| | | |
|---|---|---|
| 2003/0179760 A1 * | 9/2003 | Nakajima .................... 370/401 |
| 2005/0007952 A1 | 1/2005 | Scott |
| 2006/0209898 A1 * | 9/2006 | Abdelilah et al. ........... 370/477 |

FOREIGN PATENT DOCUMENTS

| JP | 4-265034 | 9/1992 |
|---|---|---|
| JP | 5-014456 | 2/1993 |
| JP | 6-152648 | 5/1994 |
| JP | 09-321783 | 12/1997 |
| JP | 10-154134 | 6/1998 |
| JP | 10-275213 | 10/1998 |
| JP | 2000-124947 A | 4/2000 |
| JP | 2001-326724 A | 11/2001 |
| JP | 2002-077922 A | 3/2002 |
| JP | 2002-171282 A | 6/2002 |
| JP | 2002-185498 A | 6/2002 |
| JP | 2002-247114 A | 8/2002 |
| JP | 2002-290550 A | 10/2002 |
| JP | 2002-300274 A | 10/2002 |
| JP | P3397191 | 2/2003 |
| JP | 2003-087317 A | 3/2003 |
| WO | WO 01/33787 A1 | 5/2001 |

* cited by examiner

METHOD FOR CONNECTION BETWEEN COMMUNICATION NETWORKS OF DIFFERENT TYPES AND GATEWAY APPARATUS

TECHNICAL FIELD

This invention relates to methods and apparatus for processing encoded data. More particularly, this invention relates to methods and apparatus usable with advantage for processing encoded data by a gateway apparatus for conducting connection between communication networks of different types represented by line-switched networks and packet-switched networks, such as IP networks.

BACKGROUND ART

The connection between a line-switched network and a packet-switched network such as IP (Internet Protocol), for conducting bidirectional communication, is implemented by a gateway apparatus which is for converting a variety of data, such as control information, image encoding information or speech encoding information which are based on the data format of one of the communication networks, into the data format of the other communication network. In this case, the data, including the information of various sorts, is subjected to conversion only of a communication protocol, or to transcoder processing for enabling connection under different encoding systems, as necessary. In such case, insofar as the speech encoded data is concerned, in particular, such a processing method is required in which it is possible to maintain not only the speech quality but also the communication with short delay.

FIG. 11 shows an example of a typical configuration of a conventional gateway apparatus. Referring to FIG. 11, for the direction from a line-switched network to a packet-switched network, data containing the encoded speech information, along with the control information and the encoded image information is multiplexed with a fixed word length and supplied from a line-switched network terminating circuit 100 that is for terminating the line-switched network. The multiplexed data is supplied with a preset period to a multiplexed data demultiplexing circuit 200. This multiplexed data demultiplexing circuit 200 performs processing in accordance with a preset period managed by a first timer circuit 1000. On receipt of a processing start request signal, output from the first timer circuit 1000, the multiplexed data demultiplexing circuit detects a unique word, which is an identifier used for separating multiplexed data from the line-switched network into control data, image data and speech data. Based on the so detected unique word, the multiplexed data demultiplexing circuit performs demultiplexing of the multiplexed data. The data demultiplexed by the multiplexed data demultiplexing circuit 200, that is, the control data, image data and the speech data, are supplied to a control data processing circuit 300, an image data processing circuit 400 and to a speech data processing circuit 500, respectively. The data processing circuits 300, 400 and 500 perform respective data processing operations and output the resulting data to associated packet-switched network terminating circuits 600, 700 and 800, respectively. The packet-switched network terminating circuits 600, 700 and 800 output data received from the data processing circuits 300, 400 and 500 to the packet-switched network, respectively.

On the other hand, for the direction of communication from the packet-switched network to the line-switched network, the respective packets, containing the control information, image encoding information and the speech encoding information, are received by the associated packet-switched network terminating circuits 600, 700 and 800, respectively. The control data, image encoded data and the speech encoded data are output to the control data processing circuit 300, image data processing circuit 400 and to the speech data processing circuit 500, respectively. The data processing circuits 300, 400 and 500 perform the processing operations which are the reverse of those from the line-switched network to the packet-switched network, and output the resulting data. A data multiplexing circuit 900 performs the processing in accordance with the preset period managed by the first timer circuit 1000. On receipt of a processing start request signal, output from the first timer circuit 1000, the data multiplexing circuit 900 multiplexes the data output from the data processing circuits 300, 400 and 500 to output the resulting demultiplexed data to the line-switched network terminating circuit 100. The line-switched network terminating circuit 100 sends the multiplexed data, obtained from the data multiplexing circuit 900, to the line-switched network.

FIG. 12 shows an example of a typical configuration of the speech data processing circuit 500 and the packet-switched network terminating circuit 800. Referring to FIG. 12, for the direction of communication from the line-switched network to the packet-switched network, the speech data processing circuit 500 converts the protocol of the speech encoded data, output from the multiplexed data demultiplexing circuit 200, into that of packet data, in a packet data forming circuit 501. This packet data forming circuit 501 then outputs the resulting packet speech data to a transmission circuit 801 within a packet-switched network speech data terminating circuit 800. The transmission circuit 801 sends out packet data to the packet-switched network.

Insofar as the direction from the packet-switched network to the line-switched network is concerned, a speech packet is received by a receiving circuit 802 of the packet-switched network speech data terminating circuit 800 so as to be stored in a buffer, not shown, provided in the receiving circuit 802. In the speech data processing circuit 500, a second timer circuit 511 is a circuit for outputting a processing start request to an encoded data extracting circuit 512. The encoded data extracting circuit 512 acquires speech data from the receiving circuit 802, at a time point the encoded data extracting circuit 512 has received the processing start request from the second timer circuit 511, extracts the speech encoded data and outputs the so extracted speech encoded data to the data multiplexing circuit 900.

As a gateway apparatus for connecting different type communication networks each other, there have so far been known apparatus of a variety of configurations. For example, there is known a speech gateway apparatus which has an exchanger interfacing unit and a packet controller and which is connected via an exchanger to a telephone terminal and is connected to the IP network for speech communication (see for example the Patent Document 1 below).

There has also been known an error concealment technique in the encoding/decoding of moving images in which, when an error has occurred in transmitting an image sent by an encoder, the image data, which has become unable to be decoded normally, is replaced with image data of a block that has been decoded correctly by a decoder, in order to render the deterioration in the image quality less apparent. In this Patent Document, error concealment control is executed by taking frame correlation into account for improving the image quality (see for example the Patent Document 2 below).

There are also known a variety of techniques for absorbing delay fluctuation. For example, there is known such technique in which, when the receiving time interval has become shorter than the transmitting time interval, a reference packet for recovery wait control is dynamically changed to shorten the time until sending received packets to recovery processing as propagation delay fluctuations are absorbed (see for example the Patent Document 3 below). There is also known a configuration of a media converting device including a telephone network side interfacing circuit, connected to a telephone network, an IP network side interfacing circuit, connected to the IP network, and a speech packet processing circuit, in which the media converting device is connected to a media converting controlling circuit. In this media converting device, the terminals connected in the same device are connected without media conversion to decrease speech deterioration or transmission delay (see for example the Patent Document 3 below).

There is furthermore known a receiving device for generating encoded data when a packet from the network has been delayed. This receiving device includes data inserting means which, when a speech packet from the network is delayed such that original speech data to be output has failed to be assembled, inserts encoded speech data for prohibiting idle time into a continuous data portion of the original speech data which cannot be assembled until arrival of the delayed speech packet. The receiving device further includes data discarding means which, when the data inserting means has inserted the encoded speech data for prohibiting idle time, discards plural small-sized data portions, situated in a preset non-continuous location of the assembled original speech data and continuing for a time corresponding to a time interval equivalent to the encoded speech data inserted by the data inserting means (see for example the Patent Document 5 below). Specifically, the Patent Document 5 shows a speech packet receiving apparatus intended to eliminate the problem that, if, in case underrun has occurred, delayed packets that failed to be absorbed are discarded, and substitute speech data are written in place of the delayed packet data, the amount of discarded speech data may be increased in case the discarded speech data are compressed encoded data, thus deteriorating the speech quality. To this end, the Patent Document discloses a speech packet receiving apparatus, in which the packets arriving from the network are decoded to PCM (Pulse Code Modulation) data and the resulting PCM data are output at a preset transmission speed for lowering the deterioration in the speech quality. The speech packet receiving apparatus includes an encoded speech buffer for absorbing the difference in the packet incoming time within an extent of not detracting from real-time performance, and a PCM level comparator for comparing whether or not decoded PCM data is of a speech level close to silent data which does not affect the speech quality and which therefore may safely be discarded. The speech packet receiving apparatus also includes a decimating counter controller which, when the substitute encoded PCM data is inserted, discretely decimates an amount of nearly silent PCM data corresponding to the amount of the decoded data of the inserted substitute data, at a preset time interval, based on the results of comparison by the PCM level comparator.

[Patent Document 1]
Japanese Patent Kokai Publication No. JP-P2002-290550A (page 4, FIG. 1)

[Patent Document 2]
Japanese Patent Kokai Publication No. JP-P2002-77922A (page 3, FIG. 1)

[Patent Document 3]
Japanese Patent Kokai Publication No. JP-P2002-185498A (pages 4-5, FIG. 1)

[Patent Document 4]
Japanese Patent Kokai Publication No. JP-P2001-326724A (pages 4-5, FIG. 1)

[Patent Document 5]
Japanese Patent Kokai Publication No. JP-P2000-124947A (pages 2-3, FIG. 1)

DISCLOSURE OF THE INVENTION

Problems to be Solved by the Invention

Meanwhile, in the conventional gateway apparatus, described with reference to FIGS. 11 and 12, it is presupposed that not only the speech encoded data alone but also the speech encoded data multiplexed with control data or image encoded data are supplied thereto from the line-switched network. Consequently, there is presented the problem that, under certain situations, the data may be appreciably deteriorated in quality, or speech may be appreciably delayed.

For example, if an error has been inserted in, in particular, a unique word of a multiplexed data, on a transmission channel connecting from the line-switched network to the gateway apparatus, the unique word cannot be detected in the processing by the multiplexed data demultiplexing circuit 200 of FIG. 11. Hence, the multiplexed data demultiplexing circuit 200 cannot take out speech encoded data properly from the multiplexed data received from the line-switched network. In this case, the speech data processing circuit 500, receiving the data demultiplexed by the multiplexed data demultiplexing circuit 200, cannot extract desired speech encoded data, so that no speech encoded data can be sent out to the counterpart communication network, that is, the packet-switched network. The result is that speech packets are sent out to the packet-switched network with a delay from the normal timing of sending the speech packets. In this case, a packet-switched network side terminal, as a destination of transmission, cannot take up the delay fluctuations, which add to delay fluctuations in the packet-switched network, thus producing sound breaks to deteriorate the speech quality.

As for the packet-switched network to the line-switched network, in case a buffer for taking up the delay fluctuations in the packet-switched network is provided in, for example, the receiving circuit 802 or between the receiving circuit 802 and the speech data processing circuit 500, as in Patent Documents 3 and 5, this buffer increases speech delay caused between terminals of the two communication networks.

Accordingly, it is an object of the present invention to provide a gateway apparatus for interconnecting communication networks of different types in which short delay in the call by speech, for example, may be maintained as deterioration in the signal quality is reduced to a minimum. It is another object of the present invention to a method in which, in the gateway apparatus, short delay in the call by speech, for example, may be maintained as deterioration in the signal quality is reduced to a minimum.

For accomplishing the above objects, the present invention provides, in connection with a gateway system conducting connection between a line-switched network and a packet-switched network of respective different types, a method for processing encoded data from at least one of the line-switched network and the packet-switched network towards the other. Thus, in case encoded data from at least one of the line-switched network and the packet-switched network has been delayed in arriving or lost, data for causing a destination terminal of transmission of the other network to execute error concealment processing is generated, or encoded data acquired is discarded, in order to proceed to send out encoded data. A gateway apparatus in one aspect of the present invention, in which the first communication network is a line-switched network and the second communication network is a packet-switched network, comprises first decision means for deciding on whether encoded data from the line-switched network has been delayed in arrival or lost, and first control means for performing control, if the result of the decision indicates that the encoded data has been delayed in arrival or lost, for deciding on whether encoded data for causing a destination terminal of transmission of the packet-switched network to execute error concealment processing is to be generated or the encoded data acquired is to be discarded.

A gateway apparatus in another aspect of the present invention includes second decision means for determining whether encoded data from the packet-switched network have been delayed in arriving or lost, and second control means for performing control, if the result of the decision indicates that the encoded data from the line-switched network has been delayed in arrival or lost, for deciding on whether encoded data is to be generated for causing a destination terminal of transmission on the side of the line-switched network to execute error concealment processing, or the encoded data delayed in arrival is to be discarded.

A gateway apparatus in a further aspect of the present invention includes first decision means for deciding on whether the encoded data from the line-switched network have been delayed in arrival or lost, first control means for performing control, if the result of decision indicates that the encoded data from the line-switched network has been delayed in arrival or lost, for deciding on whether data is to be generated by error concealment processing, or the acquired encoded data is to be discarded, and first decoding means for decoding the encoded data from the line-switched network, as processed by the first control means, and for outputting the resulting decoded data. The gateway apparatus also includes first encoding means for encoding the data obtained from the error concealment processing from the first control means and the decoded data from the first decoding means in accordance with an encoding system different from the encoding system for the encoded data from the line-switched network.

A gateway apparatus in a further aspect of the present invention comprises second decision means for deciding on whether the encoded data from the packet-switched network have been delayed in arrival or lost, second control means for performing control, if the result of decision indicates that the encoded data from the line-switched network has been delayed in arrival or lost, for deciding on whether data is to be generated by error concealment processing, or the acquired encoded data is to be discarded, and second decoding means for decoding the encoded data from the packet-switched network, as processed by the second control means, and for outputting the resulting decoded data. The gateway apparatus further includes second encoding means for encoding the data obtained from the error concealment processing from the second control means and the decoded data from the second decoding means in accordance with an encoding system different from the encoding system for the encoded data from the packet-switched network.

According to the present invention, preferably the first decision means compares the encoded data actually acquired per period from the line-switched network and a pre-calculated expected value, that is, the number of encoded data expected to be acquired per period, and gives a decision, based on the result of comparison, on whether the encoded data from the line-switched network have been delayed in arrival or lost.

According to the present invention, preferably the first decision means includes a first decision circuit for receiving and counting encoded data output from a multiplexed data demultiplexing circuit, demultiplexing multiplexed data from the line-switched circuit. The first decision circuit compares the number of encoded data acquired per period with an expected value, that is, the number of the encoded data expected to be output from the multiplexed data demultiplexing circuit per period, and outputs the encoded data received from the multiplexed data demultiplexing circuit if the number of the encoded data acquired is equal to the expected value. The first decision circuit outputs, along with the encoded data acquired from the multiplexed data demultiplexing circuit, a generation request signal for generating the data in deficit in case the number of the encoded data acquired is less than the expected value, while outputting, along with the encoded data acquired from the multiplexed data demultiplexing circuit, a discarding request signal for discarding the encoded data in excess if the number of the encoded data acquired is less than the expected value.

According to the present invention, preferably the first control means includes a first selection circuit for receiving at least one of the encoded data, the generation request signal and the discarding request signal, output from the first decision circuit. The first selection circuit outputs, in case of receiving only the encoded data from the first decision circuit, the encoded data received, and issues a command, in case of receiving the generation request signal, for forming data in deficit, while discarding, in case of receipt of the discarding request signal, the encoded data in excess, indicated by the discarding request signal, out of the encoded data received, and for outputting remaining portions of the encoded data. The first control means also includes a first encoded data generating circuit for generating encoded data for causing a destination terminal of transmission to execute error concealment processing responsive to a command from the first selection circuit.

According to the present invention, preferably the second decision means checks whether or not packet data from the packet-switched network can be acquired from a receiving circuit, every preset period, extracts the encoded data from the packet data in case the packet data has been acquired from the receiving circuit and verifies that the encoded data has been delayed in arrival or lost in case the packet data has failed to be acquired.

According to the present invention, preferably the second decision means includes a timer circuit for outputting a processing start request signal at a preset period, and an encoded data extraction circuit. The encoded data extraction circuit attempts to get packet data from a receiving circuit receiving packet data from the packet-switched network, at a time moment of receipt of a processing start request signal from the timer circuit or a re-acquisition request signal, and extracts encoded data from the packet data in case the trial has met with success. The encoded data extraction circuit outputs a signal to the effect that the packet data has failed to be acquired, in case the attempt for getting the packet data from the receiving circuit has failed.

The second decision means also includes a second decision circuit for outputting a generation request signal for causing a destination terminal of transmission to execute error concealment processing in case the signal received from the encoded data extraction circuit is a signal to the effect that the packet data has failed to be acquired.

The second decision means outputs the encoded data received from the encoding circuit extracting circuit in case the encoded data extracted by the encoded data extraction circuit has been received and the encoded data extraction circuit has not output the generation request signal just before.

The second decision means outputs, along with encoded data, received this time from the encoded data extraction circuit, a discarding request signal to the effect that the encoded data shall be discarded, if the result of previous decision indicates that the encoded data extraction circuit has output the generation request signal, and the encoded data, received this time, is the encoded data to be processed at an output timing of the generation request signal. The second decision means also outputs a re-acquisition signal for requesting again the encoded data to the encoded data extraction circuit.

According to the present invention, preferably the second control means includes a second selection circuit for outputting encoded data in case only the encoded data has been received from the second decision circuit, for issuing a command to execute error concealment processing in case of receipt of the generation request signal from the second decision circuit, for deleting a relevant amount of the encoded data received from the second decision circuit in case of receiving the discarding request signal from the second decision circuit, and for outputting remaining portions of the encoded data, and a second encoded data generating circuit responsive to the command for executing the error concealment processing from the second selection circuit to generate encoded data necessary for a terminal on the line-switched network to carry out the error concealment processing.

According to the present invention, there may be provided a transcoder function. In this case, the first control means of the gateway apparatus includes a first selection circuit for receiving at least one of the encoded data, the generation request signal and the discarding request signal, from the first decision circuit, for outputting, in case of receipt only of the encoded data from the first decision circuit, the encoded data received, for issuing a command for forming the data in deficit, in case of receipt of the generation request signal, and for discarding, in case of receipt of the discarding request signal, a number of the encoded data received, indicated by the discarding request signal, and for outputting the remaining portions of the encoded data. The first control means also includes a first error concealment processing circuit for receiving the command from the first selection circuit for generating data by error concealment processing. In this configuration, there are provided a first decoding circuit for decoding encoded data from the line-switched network, processed by the first selection circuit of the first control means, and for outputting decoded data, and a first encoding circuit for encoding data obtained from the first decoding circuit and data obtained from the first error concealment processing circuit.

A gateway apparatus in a further aspect of the present invention may include a transcoder function. In this case, the second control means includes a second selection circuit for outputting encoded data when only the encoded data has been received from the second decision circuit, for issuing a command for execution of error concealment processing in case of receiving a generation request signal from the second decision circuit and for deleting only relevant portions of the encoded data received from the second decision circuit and outputting remaining portions of the encoded data, and a second error concealment processing circuit for generating data by error concealment processing. The second decoding means includes a second decoding circuit for decoding encoded data from the packet-switched network, processed by the second selection circuit of the second control means, to output decoded data, and a second encoding circuit for encoding and outputting data obtained from the second decoding circuit and data obtained from the second error concealment processing circuit.

A method for processing encoded data in a further aspect of the present invention by a gateway apparatus for conducting connection between a line-switched network and a packet-switched network, comprises (a1) a step of the gateway apparatus deciding whether encoded data from the line-switched network has been delayed in arrival or lost, and (b1) a step of the gateway apparatus generating encoded data for causing a destination terminal of transmission to execute error concealment processing or discarding encoded data acquired in case the result of the decision indicates that data from the line-switched network has been delayed in arrival or lost.

A method according to a further aspect of the present invention includes (a2) a step of the gateway apparatus interconnecting communication networks of respective different types, which are a line-switched network and a packet-switched network, deciding on whether encoded data from the packet-switched network has been delayed in arrival or lost; and (b2) a step of the gateway apparatus generating data for causing a destination terminal of transmission to execute error concealment processing or discarding encoded data acquired in case the result of the decision indicates that the encoded data from the packet-switched network has been delayed in arrival or lost.

A method according to a further aspect of the present invention includes (a1) a step of the gateway apparatus deciding on whether encoded data from the line-switched network has been delayed in arrival or lost, and (b1) a step of the gateway apparatus generating data by error concealment processing or discarding encoded data acquired in case the result of the decision indicates that the encoded data from the line-switched network has been delayed in arriving or lost, (c1) a step of the gateway apparatus decoding encoded data from the line-switched network, processed in the step (b1) and outputting the resulting decoded data, and (d1) a step of the gateway apparatus encoding the data obtained by the error concealment processing and the decoded data in accordance with an encoding system different from that for encoded data from the line-switched network and outputting the resulting data.

A method according to a further aspect of the present invention includes (a2) a step of the gateway apparatus deciding on whether encoded data from the packet-switched network has been delayed in arrival or lost; and (b2) a step of the gateway apparatus generating data by error concealment processing or discarding encoded data delayed in arriving in case the result of the decision indicates that the encoded data from the line-switched network has been delayed in arrival or lost;

(c2) a step of the gateway apparatus decoding encoded data from the packet-switched network, processed in the step (b2), and outputting the resulting decoded data; and (d2) a step of the gateway apparatus encoding the data obtained by the error concealment processing and the decoded data in accordance with an encoding system different from that for encoded data from the packet-switched network, and outputting the resulting data.

In the method of the present invention, preferably the step (a1) includes:

(a11) a step of receiving and counting encoded data output from a multiplexed data demultiplexing circuit demultiplexing multiplexed data received from the line-switched network and comparing the number of the encoded data acquired per period with an expected value, that is, the number of encoded data expected to be output per period from the multiplexed data demultiplexing circuit, and (a12) a step of outputting, if the result of comparison indicates that the number of the encoded data acquired is equal to the number of the expected value, the encoded data received from the multiplexed data demultiplexing circuit, outputting, if the result of comparison indicates that the number of the encoded data acquired is less than the number of the expected value, a generation request signal for generating data in deficit, along with the encoded data acquired from the multiplexed data demultiplexing circuit, and outputting, if the result of comparison indicates that the number of the encoded data acquired is greater than the number of the expected value, a discarding request signal for discarding the encoded data in excess, along with the encoded data acquired from the multiplexed data demultiplexing circuit.

In the method of the present invention, preferably the step (b1) includes:

(b11) a step of receiving the encoded data, the generation request signal or the discarding request signal, output from the step (a12), outputting, if the encoded data only is received, the encoded data received, issuing a command for forming data in deficit if the generation request signal is received, and discarding, if the discarding request signal is received, a number of the encoded data received, corresponding to the number indicated by the discarding request signal, and outputting the remaining portion of the encoded data; and (b12) a step of generating, responsive to the command for forming the data in deficit, the encoded data for causing a destination terminal of transmission to execute the error concealment processing.

In the method of the present invention, the step (a2) includes:

(a21) a step of making a trial to get packet data from a receiving circuit receiving packet data from the packet-switched network, at a time moment of receipt of a processing start request signal output from a timer circuit at a preset period, or a re-acquisition request signal, and extracting the encoded data from the packet data if the trial has met with success and outputting a signal to the effect that packet data has failed to be acquired if the attempt of acquiring packet data from the receiving circuit has failed, by way of executing encoded data extracting processing; and (a22) a step of outputting a generation request signal for causing a destination terminal of transmission to execute error concealment processing in case an output of the sub-step (a21) is the signal to the effect that packet data has failed to be acquired, for receiving the encoded data output in the step (a21) and outputting the encoded data output in the step (a21) if the generation request signal has failed to be output right before. The step also outputs, if the result of previous decision indicates that the generation request signal has already been output in the sub-step (a21) and the encoded data output in the sub-step (a21) for the present is the encoded data which should be processed at an output timing of the generation request signal, the encoded signal and, together therewith, a discarding request signal indicating that the encoded data shall be discarded. The sub-step also outputs a re-acquisition request signal for requesting again the encoded data to the encoded data extracting processing of the sub-step (a21).

According to the present invention, preferably the sub-step (b2) includes:

(b21) a step of issuing a command for executing error concealment processing if the generation request signal is output from the sub-step (a22), and deleting relevant portions of the encoded data output in the sub-step (a22), as the remaining portions of the encoded data is output, in case the discarding request signal has been output in the sub-step (a22), and (b22) a step of generating encoded data necessary for a destination of transmission of the line-switched network to execute error concealment processing.

Meritorious Effect of the Invention

According to the present invention, speech packet data in excess is not sent to suppress delay at the destination of transmission, thereby achieving call by speech where short delay with minimum deterioration of speech quality is required.

The present invention contemplates to deal with the situation in which the balance of the number of the encoded data in a speech packet received from a packet-switched network and the periodic acquisition of the encoded data extraction processing is upset in connection with the storage space in a buffer for taking up delay fluctuations in the packets received from the packet-switched network. That is, when the buffer has become depleted, speech encoded data is generated by processing for generating the encoded data, based on a signal to the effect that packet data has failed to be acquired, and sent to processing for data multiplexing, in order for a terminal at the destination of transmitted to execute error concealment processing, while the delayed speech packet data received are discarded, thereby achieving call by speech with short delay with minimum deterioration of speech quality.

Furthermore, according to the present invention, signal delay may be suppressed, while deterioration of the signal quality may be minimized, even in case the invention is applied to a transcoder function of re-encoding input encoded data by another encoding system to output the resulting re-encoded data.

EXPLANATION OF NUMERALS

Figure 1:
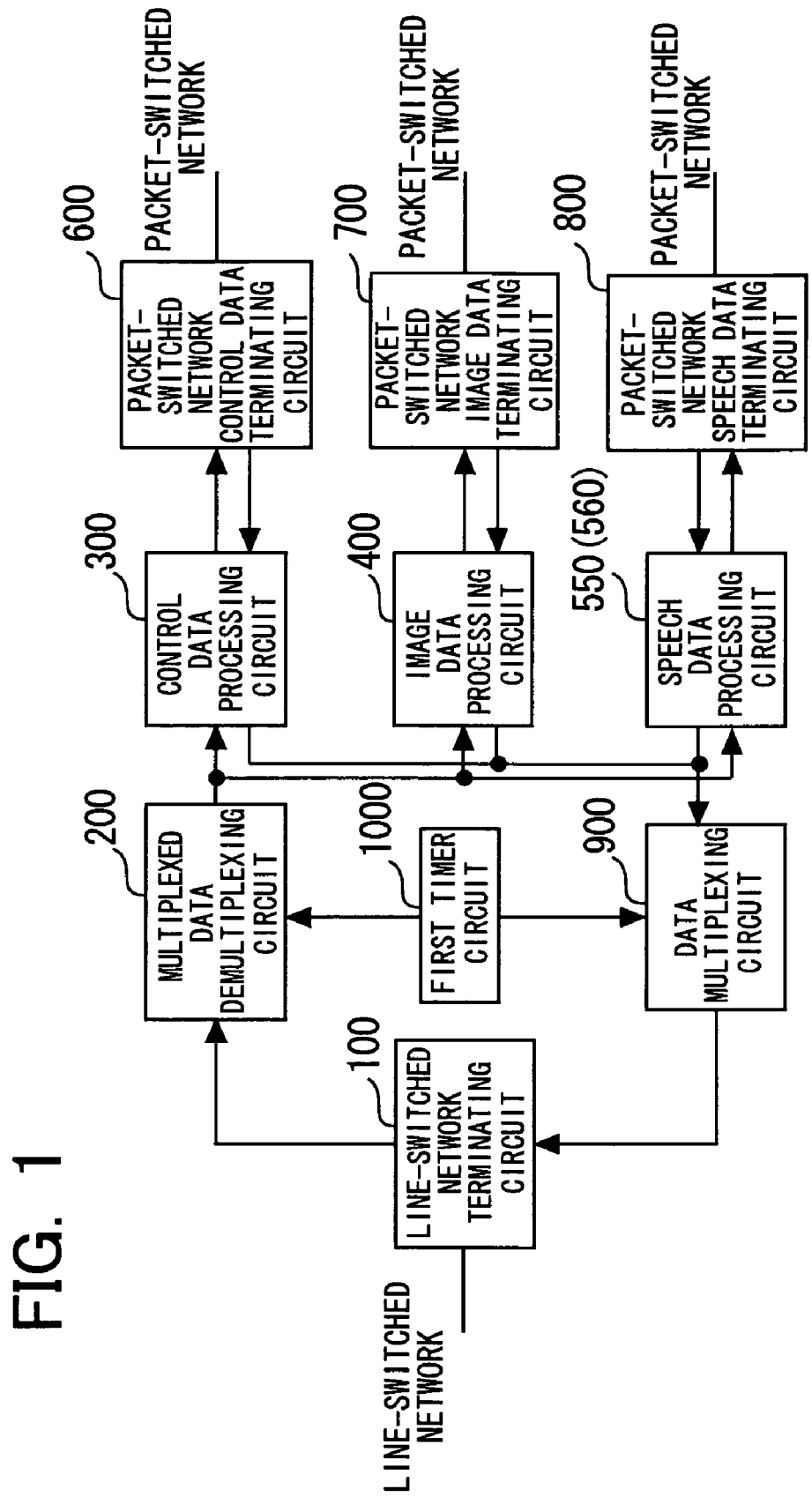
FIG. 1 is a diagram showing the configuration of a gateway apparatus according to a first embodiment of the present invention.

100 line-switched network terminating circuit
200 multiplexed data demultiplexing circuit
300 control data processing circuit
400 image data processing circuit
500 speech data processing circuit
501 packet data forming circuit
502 first decision circuit
503 first selection circuit
504 first encoded data generating circuit
505 first error concealment processing circuit
506 first decoding circuit
507 first encoding circuit
511 second timer circuit
512 encoded data extracting circuit
513 second decision circuit
514 second selection circuit
515 second encoding data generating circuit
516 second error concealment processing circuit
517 second decoding circuit
518 second encoding circuit
550, 560 speech data processing circuit
600 packet-switched network control data terminating circuit
700 packet-switched network image data terminating circuit
800 packet-switched network speech data terminating circuit
801 transmission circuit
802 receiving circuit
900 multiplexed data demultiplexing circuit
1000 first timer circuit

PREFERRED EMBODIMENTS OF THE INVENTION

The present invention will now be described in detail with reference to preferred embodiments shown in the drawings. In the direction from the line-switched network to the packet-switched network, a gateway apparatus for connecting the line-switched network and the packet-switched network each other, in a preferred embodiment of the present invention, compares the number of speech encoded data actually acquired per a preset period from a multiplexed data demultiplexing circuit (200) which operates at a preset period, with an expected value of the number of the speech encoded data. This expected value is the number of encoded data expected to be output from the multiplexed data demultiplexing circuit (200) per period, and is calculated from the period and the frame time duration of the speech encoding system. Based on the result of comparison, suitable decision processing is carried out and, based on the result of decision, processing for generating encoded data or discarding the encoded data is carried out to make number of the packet data sent out per period constant, thereby minimizing the deterioration of the signal quality at the destination terminal and making it possible to maintain short delay in speech communication. In similar manner, in the direction from the packet-switched network towards the line-switched network, if a packet is delayed in arriving, due to delay fluctuations in the packet-switched network, a signal to the effect that packet data has failed to be acquired is output in a process of extracting encoded data from received packet data. Based on an output from the processing of extracting encoded data, a proper decision is given and, based on the result of the decision, the processing for generating encoded data or that for discarding the encoded data is carried out. In more detail, a gateway apparatus for conducting connection between a line-switched network and a packet-switched network, according to an embodiment of the present invention, includes a multiplexed data demultiplexing circuit (200) for demultiplexing multiplexed data from the line-switched network, a data processing circuit (550), and a transmission circuit (801). The data processing circuit packetizes the encoded data demultiplexed by the multiplexed data demultiplexing circuit, and outputting the resulting packet data, and the transmission circuit transmits the packet data output from the data processing circuit to the packet-switched network.

Figure 2:
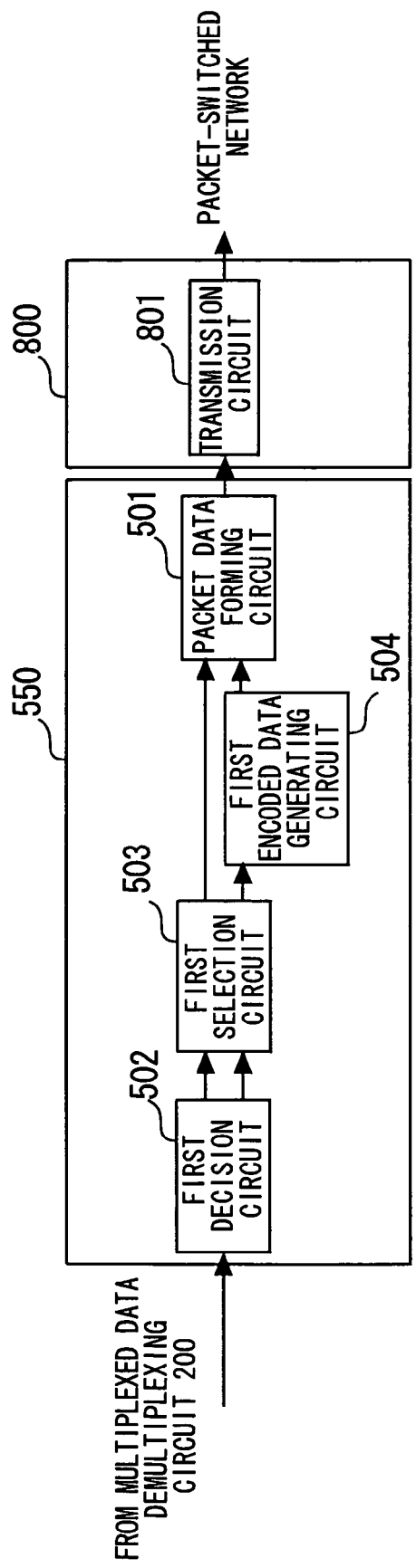
FIG. 2 is a diagram showing the configuration relevant to processing in a direction from a line-switched network to a packet-switched network in a speech data processing circuit in the first embodiment of the present invention.

Referring to FIG. 2, the data processing circuit (550) in a first embodiment of the present invention includes a packet data forming circuit (501), a first decision circuit (502), a first selection circuit (503) and a first encoded data generating circuit (504).

The first decision circuit (502) receives and counts encoded data output from the multiplexed data demultiplexing circuit (200). The first decision circuit then compares the number of the encoded data, acquired for a preset period, with an expected value, that is, the number of the encoded data expected to be output from the multiplexed data demultiplexing circuit (200) for the above period. Based on the result of the comparison, the following processing is performed:

if the number of the encoded data acquired is equal to the expected value, the encoded data received from the multiplexed data demultiplexing circuit is output;
  if the number the encoded data acquired is less than the above expected value, a generation request signal for generating data in deficit is output; and
  if the number the encoded data acquired is greater than the above expected value, a discarding request signal for discarding the encoded data in excess is output.

A first selection circuit (503) receives at least one of the encoded data, the generation request signal and the discarding request signal, output from the first decision circuit (502), and performs control (I) to (III) below, based on the received signal.

(I) In case the first selection circuit (503) has received only the encoded data from the first decision circuit (502), the first selection circuit outputs the encoded data received.

(II) In case the first selection circuit (503) has received the generation request signal from the first decision circuit (502), the first selection circuit issues a command to generate encoded data in deficit.

(III) In case the first selection circuit (503) has received the discarding request signal from the first decision circuit (502), the first selection circuit discards a number of the received encoded data corresponding to the number indicated by the discarding request signal, and outputs the remaining portions of the encoded data.

Responsive to the command from the first selection circuit (503), the first encoded data generating circuit (504) generates encoded data for having the processing of error concealment executed by a destination terminal of transmission on the packet-switched network side.

The packet data forming circuit (501) receives encoded data output from the first selection circuit (503) or encoded data output from the first encoded data generating circuit (504) to convert the data into data of the packet data format.

Figure 3:
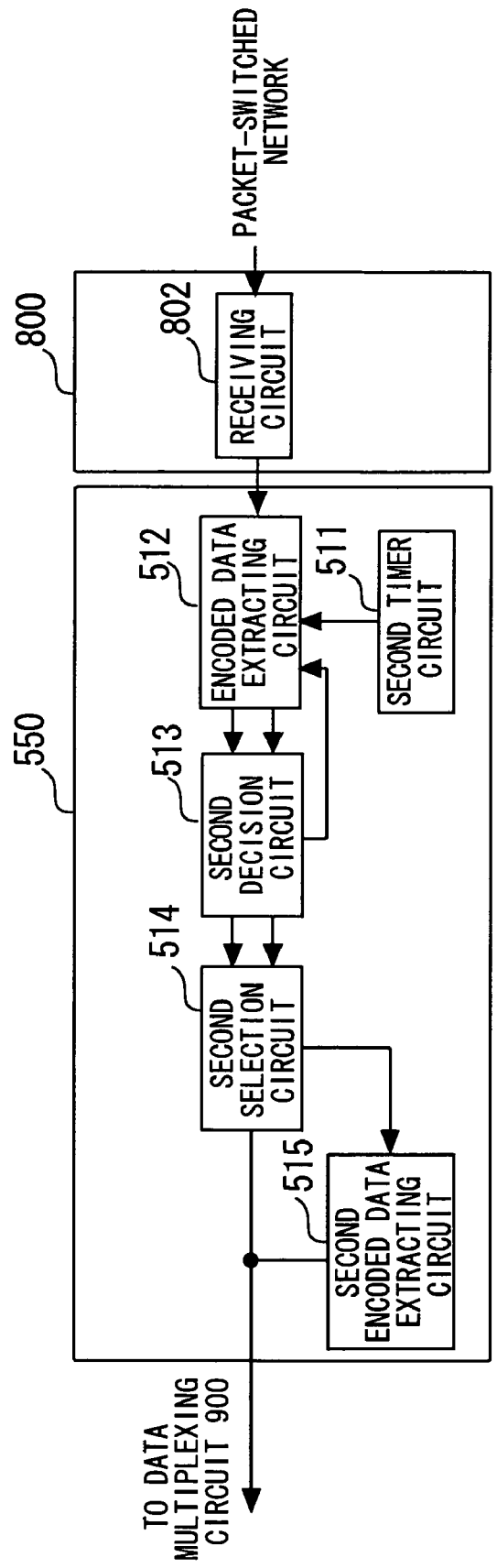
FIG. 3 is a diagram showing the configuration relevant to processing in a direction from the packet-switched network to the line-switched network in the speech data processing circuit in the first embodiment of the present invention.

Referring to FIG. 3, a data processing circuit (550) in an embodiment of the present invention includes a second timer circuit (511), an encoded data extracting circuit (512), a second decision circuit (513), a second selection circuit (514) and a second encoded data extracting circuit (515).

The second timer circuit (511) outputs a processing start request signal at a preset period. At a time point of receipt of a processing start request signal from the second timer circuit (511), or a re-acquisition request signal, the encoded data extracting circuit (512) makes a trial to obtain packet data from the receiving circuit (802). If the trial has met with success, the encoded data is extracted from the packet data. If the trial to obtain packet data from the receiving circuit has failed, a signal to the effect that the trial to obtain packet data has failed is output.

The second decision circuit (513) receives the encoded data extracted from the encoded data extracting circuit (512), or the signal to the effect that the trial to obtain packet data has failed, output from the encoded data extracting circuit. Based on the signals received, the second decision circuit performs the following control (I) to (III):

(I) In case the second decision circuit (513) has received from the encoded data extracting circuit (512) the signal to the effect that the trial to obtain packet data acquisition has failed, the second decision circuit outputs a generation request signal in order for a destination terminal of the line-switched network to carry out the error concealment processing.

(II) In case the second decision circuit (513) has received from the encoded data extracting circuit (512) the encoded data and the encoded data extracting circuit (512) has output no generation request signal just before, the second decision circuit outputs the encoded data received from the encoded data extracting circuit (512).

(III) If, as a result of previous decision, the encoded data extracting circuit (512) has output the generation request signal, and the encoded data, received for the present from the encoded data extracting circuit (512) is the encoded data to be processed at an output timing of the generation request signal, the second decision circuit (513) outputs the encoded data and, together therewith, a discarding request signal to the effect that the encoded data shall be discarded. Furthermore, the second decision circuit outputs a re-acquisition signal, for requesting the encoded data again, to the encoded data extracting circuit (512).

The second selection circuit (514) receives the encoded data, generation request signal or the discarding request signal, from the second decision circuit (513). In case the signal received is the generation request signal, the second selection circuit commands encoded data necessary to carry out the error concealment processing. In case the signal received is the discarding signal, the encoded data is discarded.

The second encoded data extracting circuit (515) generates encoded data necessary for a line-switched network side terminal to carry out error concealment processing. The encoded data generated by the second selection circuit (514) or the second encoded data extracting circuit (515) is sent out via data multiplexing circuit (900) to the line-switched network.

The present invention is similarly applicable to a gateway apparatus having the function of a transcoder receiving data encoded in for example a first encoding system and outputting encoded data re-encoded in accordance with a second encoding system, as will be described in the following embodiments.

EMBODIMENTS

Figure 11:
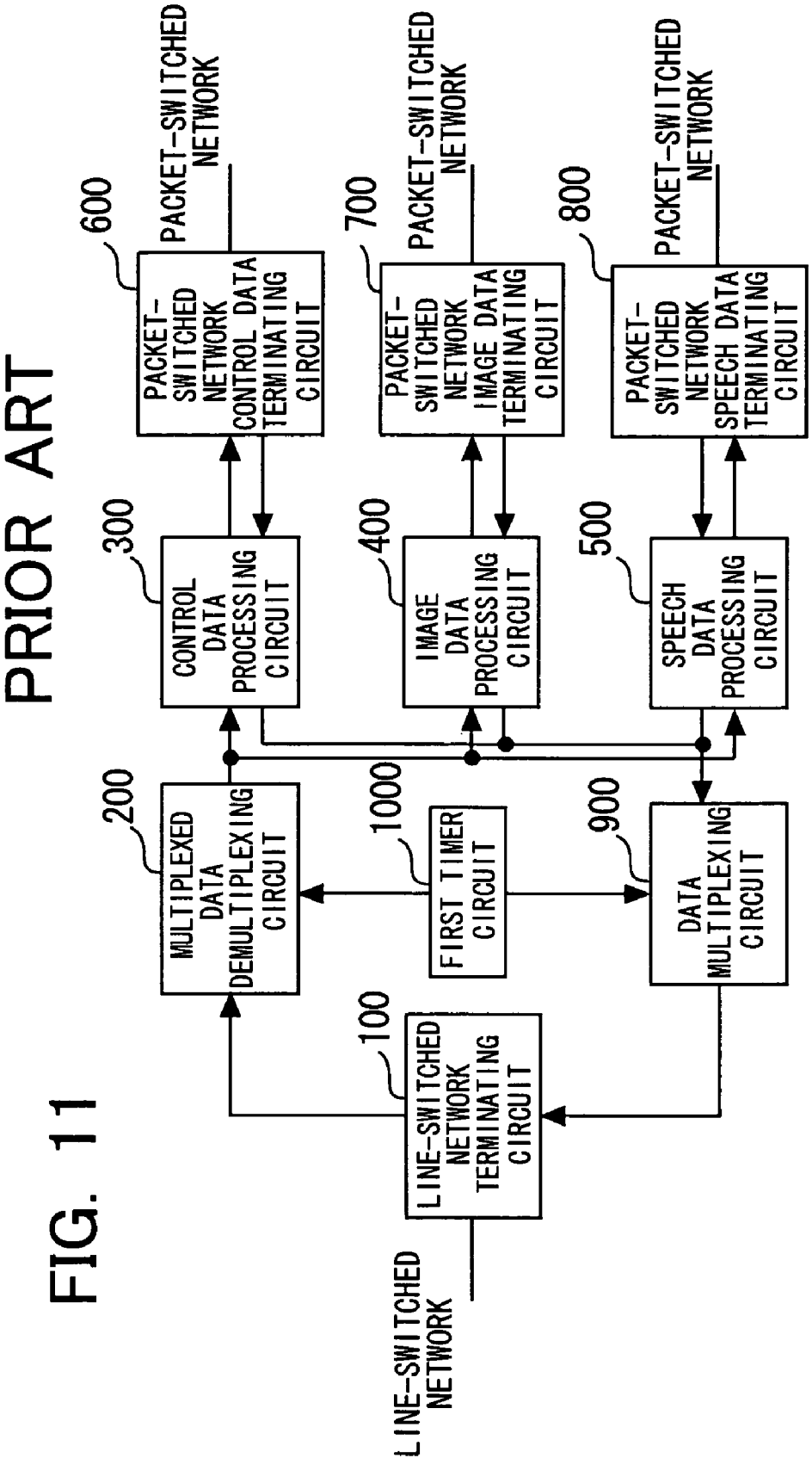
FIG. 11 is a diagram showing the configuration of a conventional gateway apparatus.
Figure 12:
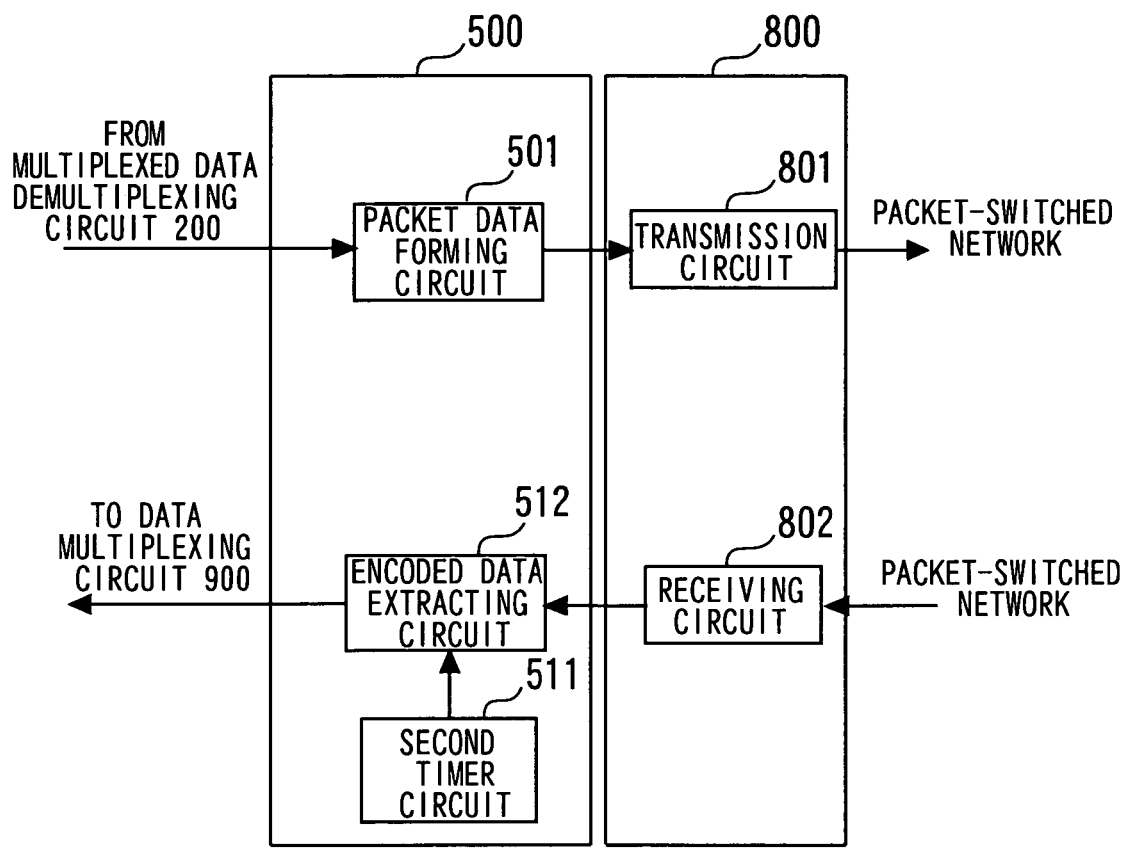
FIG. 12 is a diagram showing a typical conventional speech processing circuit.

Preferred embodiments of the present invention will now be described with reference to the drawings. FIG. 1 is a diagram showing the configuration of a first embodiment of the present invention. In FIG. 1, there is shown the configuration of a gateway apparatus of the present embodiment used for interconnecting the line-switched network and the packet-switched network. In FIG. 1, the elements which are the same as or similar to those shown in FIG. 11 are indicated by the same reference numerals. Referring to FIG. 1, the gateway apparatus of the present embodiment includes a line-switched network terminating circuit 100, a multiplexed data demultiplexing circuit 200, a data multiplexing circuit 900, a first timer circuit 1000, a control data processing circuit 300, a packet-switched network terminating circuit 600, an image data processing circuit 400, and a packet-switched network terminating circuit 700. The gateway apparatus also includes a speech data processing circuit 550 and a packet-switched network terminating circuit 800. The speech data processing circuit 550 of the present embodiment is different from the conventional speech data processing circuit 500, shown in FIG. 11, in that the speech data processing circuit 550 includes the functions of inserting and discarding packets. Meanwhile, the input/output data formats of the speech data processing circuit 550 are the same as those of conventional system shown in FIG. 11. It is noted that the following explanation will be centered about the speech data processing circuit 550 having the inserting and discarding functions, and the explanation of the same components as those of FIG. 11 is omitted from time to time.

It is assumed that data multiplexed from speech data, image data and control data, each of a preset length, are sent from the line-switched network terminating circuit 100. The multiplexed data are demultiplexed into the control data, image data and speech data, by the multiplexed data demultiplexing circuit 200, with a period managed by the first timer circuit 1000. The multiplexed data demultiplexing circuit 200 sends the demultiplexed control, image and speech data to the control data processing circuit 300, image data processing circuit 400 and to the speech data processing circuit 550, respectively. The data processing circuits 300, 400 and 550 process the data received and output the processed data to the associated packet-switched network terminating circuits 600, 700 and 800, respectively. The packet-switched network terminating circuits 600, 700 and 800 packetize data received from the data processing circuits 300, 400 and 550 to send the resulting packetized data to the packet-switched network. The above-described sequence of operations is carried out on multiplexed data received from the line-switched network.

In the direction from the packet-switched network to the line-switched network, the packet-switched network terminating circuits 600, 700 and 800 receive the packets containing the control information, encoded image information and the encoded speech information, respectively. The control data, image encoded data and the speech encoded data are sent to the control data processing circuit 300, image data processing circuit 400 and to the speech data processing circuit 550, respectively. The control data processing circuit 300, image data processing circuit 400 and the speech data processing circuit 550 perform the processing of conversion which is the reverse of the processing from the line-switched network to the packet-switched network, and send processed result data to the data multiplexing circuit 900. The data multiplexing circuit 900 multiplexes the data output from the control data processing circuit 300, image data processing circuit 400 and the speech data processing circuit 550, in accordance with a constant period managed by the first timer circuit 1000, and outputs the resulting multiplexed data to the line-switched network terminating circuit 100. The line-switched network terminating circuit 100 sends the multiplexed data, received from the data multiplexing circuit 900, to the line-switched network.

FIGS. 2 and 3 show two examples of the configuration of the speech data processing circuit 550 of FIG. 1. Referring to FIG. 2, the speech data processing circuit 550 includes, in the direction from the line-switched network to the packet-switched network, a packet data forming circuit 501, a first decision circuit 502, a first selection circuit 503 and a first encoded data generating circuit 504.

The first decision circuit 502 acquires speech encoded data, output at a constant period from the multiplexed data demultiplexing circuit 200, and repeatedly counts the number acquired of the speech encoded data at every period. The first decision circuit 502 pre-calculates a value of the number of the speech encoded data, expected to be output per period from the multiplexed data demultiplexing circuit 200, based on the period and the frame time duration of the speech encoding system, and holds the so pre-calculated value in a storage device, not shown. The first decision circuit 502 compares the number of the speech encoded data acquired with the number expected to be output per period from the multiplexed data demultiplexing circuit 200 (expected value). If the result of comparison indicates that the two values are equal, all of the speech encoded data are output to the packet data forming circuit 501. If the number of the speech encoded data received per period from the multiplexed data demultiplexing circuit 200 is less than the pre-calculated expected value, the first decision circuit 502 outputs a generation request signal, for generating the number of the encoded data in deficit by the encoded data generating circuit 504, along with the speech encoded data acquired. If the number of the speech encoded data received per period from the multiplexed data demultiplexing circuit 200 is greater than the expected value, the first decision circuit 502 manages control for outputting, along with the speech encoded data acquired, a discarding request signal for discarding the speech encoded data in excess.

The first selection circuit 503 receives the speech encoded data, generation request signal and the discarding request signal, from the first decision circuit 502, and changes over the processing, depending on the information received, to output the speech encoded data to the packet data forming circuit 501.

The first encoded data generating circuit 504 generates speech encoded data, needed for a destination terminal of transmission, not shown, on the packet-switched network side, to execute error concealment processing, and outputs the so generated speech encoded data to the packet data forming circuit 501. The packet data forming circuit 501 converts the speech encoded data into data of the packet data formats, which data is then sent to the transmission circuit 801.

Referring to FIG. 3, the speech data processing circuit 550 includes, in a direction from the packet-switched network to the line-switched network, a second timer circuit 511, an encoded data extracting circuit 512, a second decision circuit 513, and a second encoded data extracting circuit 515.

The second timer circuit 511 outputs a processing start request signal at a constant period. At a time point of receipt of the processing start request signal from the second timer circuit 511 or the re-acquisition request signal from the second decision circuit 513, the encoded data extracting circuit 512 makes a trial to obtain speech data from the receiving circuit 802, which receives speech packets. If the trial has met with success, the encoded data extracting circuit 512 makes a trial to obtain speech data from the receiving circuit 802 which receives speech packets. If the trial has met with success, the encoded data extracting circuit extracts speech encoded data from the speech data. If conversely the trial to obtain speech data from the receiving circuit 802 has failed, the encoded data extracting circuit outputs a signal indicating that packet data acquisition has failed to be acquired. The second decision circuit 513 receives speech encoded data acquired from the encoded data extracting circuit 512 or the signal indicating that packet data acquisition has failed. In case the signal received is the signal indicating that packet data acquisition has failed, the second decision circuit 513 outputs a generation request signal for selecting the second encoded data extracting circuit 515 in order for a terminal on the line-switched network to carry out the error concealment processing. In case the signal received is the speech encoded data, and the generation request signal has not been output just before, the second decision circuit 513 outputs the encoded speech signals to the second selection circuit 514. In case the generation request signal has been output at the time of previous decision, and the speech encoded data, acquired for the present time, is the encoded data which should be processed at the request signal outputting timing, the second decision circuit 513 outputs, along with the speech encoded data, the discarding request signal to the effect that the speech encoded data is to be discarded, to the second selection circuit 514. The second decision circuit 513 outputs a re-acquisition request signal to the encoded data extracting circuit 512 for requesting speech encoded data again. The second encoded data extracting circuit 515 outputs speech encoded data necessary for a terminal of the line-switched network to carry out speech concealment processing.

The operation in the speech data processing circuit 550, in the direction from the line-switched network to the packet-switched network, will now be described. In FIG. 11, the first timer circuit 1000 outputs a processing start request signal at a constant time period. The multiplexed data demultiplexing circuit 200 performs processing at a constant period managed by the first timer circuit 1000. Specifically, on receipt of the processing start request signal, output from the first timer circuit 1000, the multiplexed data demultiplexing circuit 200 performs the processing of detecting a unique word and demultiplexing into control data, image data and speech data, from the signal, received from the line-switched network terminating circuit 100 and outputs speech encoded data.

Figure 4:
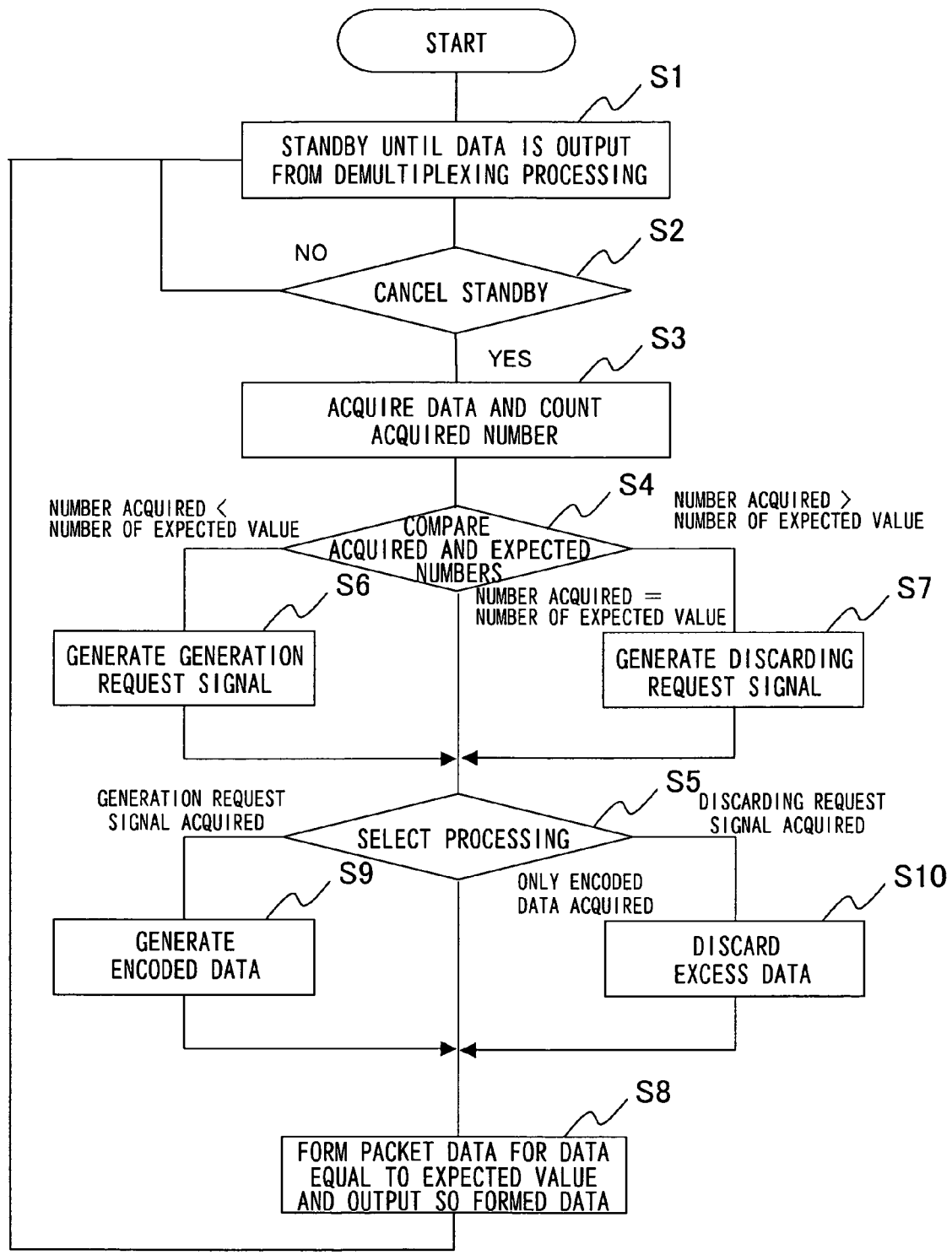
FIG. 4 is a flowchart for illustrating the processing for the direction from the line-switched network to the packet-switched network in the speech data processing circuit in the first embodiment of the present invention.

FIG. 4 is a flowchart for illustrating the operation for processing encoded data in the direction from the line-switched network to the packet-switched network in the speech data processing circuit 550 in the embodiment shown in FIG. 2. The first decision circuit 502 is in a standby state until data is output from the multiplexed data demultiplexing circuit 200 (step S1). When the standby state is released (step S2), the first decision circuit receives the speech encoded data output from the multiplexed data demultiplexing circuit 200. The first decision circuit 502 counts up the number acquired per period (step S3).

From the period and the frame time duration of the speech encoding system, the first decision circuit 502 calculates the number of the speech encoded data, expected to be output from the multiplexed data demultiplexing circuit 200 per period (expected value). The number of the speech encoded data, expected to be output from the multiplexed data demultiplexing circuit 200 per period, is compared to the number of the speech encoded data actually acquired (step S4).

If the result of comparison indicates that the two numbers coincide with each other, the first decision circuit 502 outputs all of the speech encoded data per period, received from the multiplexed data demultiplexing circuit 200, to the first selection circuit 503.

If, in the first decision circuit 502, the number of the speech encoded data as counted per period is less than the number of the speech encoded data expected to be output from the multiplexed data demultiplexing circuit 200 per period (expected value), a generation request signal, indicating that a number equal to the number of the speech encoded data in deficit (=expected value−number actually acquired) is to be generated in the first encoded data generating circuit 504, is delivered to the first selection circuit 503 along with the speech encoded data actually acquired (step S6). The generation request signal is output for a case the number of the speech encoded data as counted per period is less than the expected value from the consideration that, in such case, the multiplexed data has failed to be properly demultiplexed in the multiplexed data demultiplexing circuit 200, or the speech data has failed to be demultiplexed at the timing concerned due to increase in an amount of data other than the speech encoded data.

If, in the first decision circuit 502, the number of the speech encoded data counted per period exceeds the number of the speech encoded data expected to be output from the multiplexed data demultiplexing circuit 200 per period (expected value), the first decision circuit sends a discarding request signal to the first selection circuit 503, along with the speech encoded data actually acquired (step S7). The discarding request signal indicates that the amount of the speech encoded data in excess (=number actually acquired−expected value) shall be discarded.

The first selection circuit 503 receives the speech encoded data output from the first decision circuit 502 or, together therewith, the generation request signal or the discarding request signal as the case may be. In case only the speech encoded data has been delivered from the first decision circuit 502 to the first selection circuit 503 (branching to 'acquisition only of encoded data' in a step S5), the first selection circuit 503 outputs all of the speech encoded data to the packet data forming circuit 501.

When the generation request signal has been supplied, along with the speech encoded data, from the first decision circuit 502 to the first selection circuit 503 (branching to 'acquisition of the generation request signal' in the step S5), the first selection circuit 503 causes the first encoded data generating circuit 504 to generate a number of the speech encoded data indicated by the generation request signal, to send the speech encoded data from the first decision circuit 502 and the speech data generated by the first encoded data generating circuit 504 to the packet data forming circuit 501 (step S9). The first encoded data generating circuit 504 generates speech encoded data for the destination terminal of transmission to execute error concealment processing.

When the first selection circuit 503 has acquired the discarding request signal, along with the speech encoded data, from the first decision circuit 502 (branching to 'acquisition of discarding request signal' in the step S5), the first selection circuit 503 discards a number of the speech encoded data indicated by the discarding request signal, out of the speech encoded data received and outputs the remaining portions of the speech encoded data to the packet data forming circuit 501 (step S10).

The packet data forming circuit 501 performs protocol conversion of the speech encoded data, output from the first selection circuit 503, into data of packet data format and outputs the resulting data to the packet-switched network terminating circuit 800 (step S8).

As a result of the above-described sequence of operations, a number of the packet data, which is in accord with the operating period, are sent out from the transmission circuit 801.

The operation for the direction from the packet-switched network to the line-switched network will now be described. It is assumed that speech packets are received by the receiving circuit 802 of the packet-switched network terminating circuit 800, from the packet-switched network (see FIG. 3), and a preset number of the speech packets are stored in a buffer for taking up the delay fluctuations to a certain extent, after which processing start request signals start to be output at a preset period from the second timer circuit 511.

Figure 5:
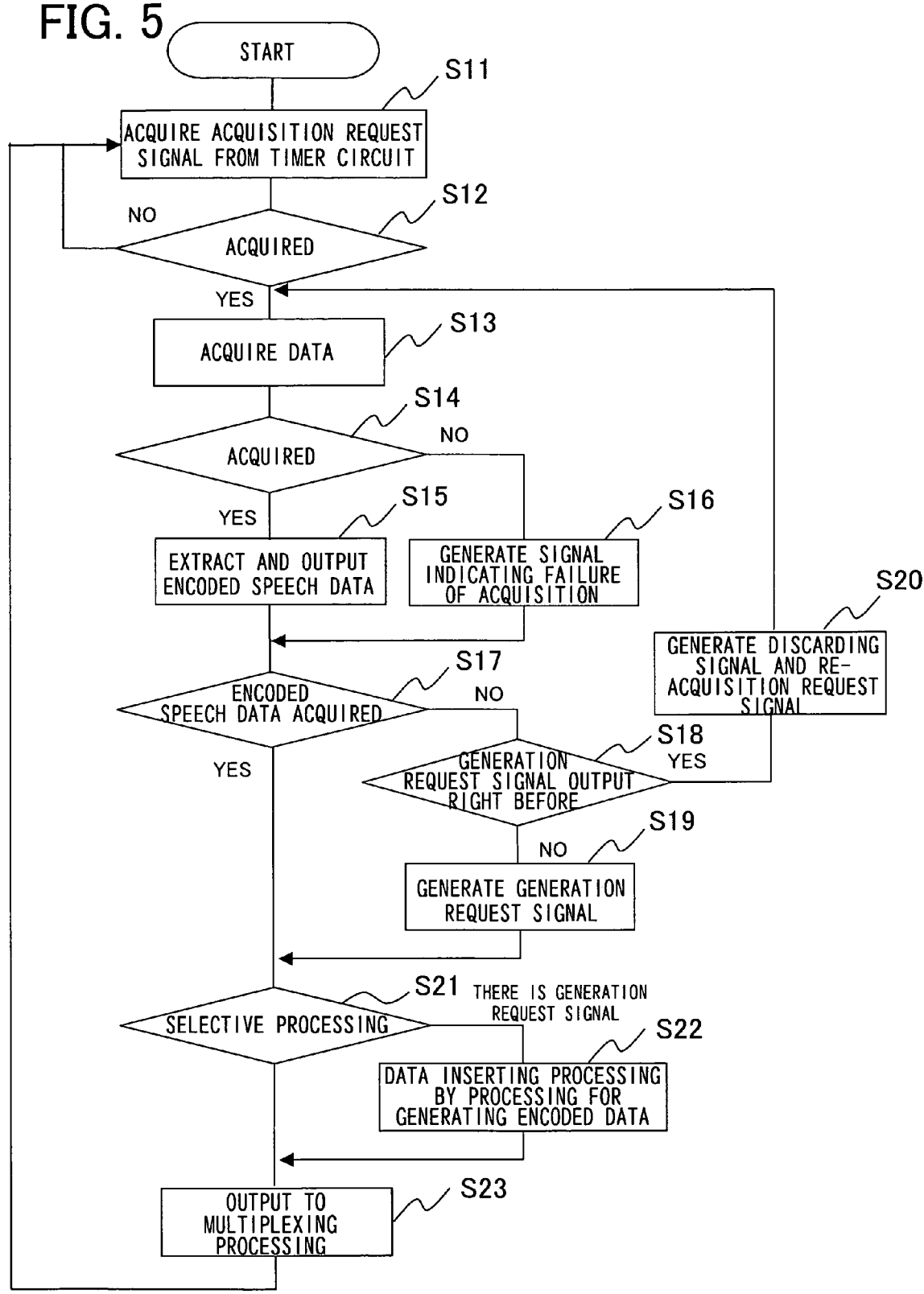
FIG. 5 is a flowchart for illustrating the processing for the direction from the packet-switched network to the line-switched network in the speech data processing circuit in the first embodiment of the present invention.

FIG. 5 is a flowchart for illustrating the operation of processing encoded data, in the speech data processing circuit 550 of the present embodiment shown in FIG. 3, in the direction from the packet-switched network to the line-switched network.

At a time point when the processing start request signal from the second timer circuit 511, or the re-acquisition request signal from the second decision circuit 513, has been acquired, the encoded data extracting circuit 512 makes a trial to obtain suitable speech data from the receiving circuit 802 (steps S11 to S13).

If, in the encoded data extracting circuit 512, the trial to obtain the suitable speech data from the receiving circuit 802 has met with success, the speech encoded data is extracted from the speech data, and the so extracted data is output (step S15).

If conversely the trial to obtain suitable speech data from the receiving circuit 802 has failed, such that speech data has failed to be obtained, the encoded data extracting circuit 512 outputs to the second decision circuit 513 a signal indicating that acquisition of speech encoded data has failed (step S16).

The second decision circuit 513 receives the encoded speech signal, output from the encoded data extracting circuit 512, or a signal indicating that acquisition of the encoded speech signal has failed.

In case the signal received from the encoded data extracting circuit 512 is a signal indicating that acquisition of the encoded speech signal has failed (NO of step S17), the second decision circuit 513, acting on the judgment that the input-output number balance in the buffer held by the receiving circuit 802 has been upset due to delay fluctuations in the packet-switched network, or packet loss has occurred in the packet-switched network, such that suitable speech data has failed to be acquired, outputs a generation request signal (step S19). This generation request signal indicates that the second encoded data extracting circuit 515 shall be selected in order for the terminal, not shown, on the communication network of the destination of transmission, herein the line-switched network, to execute error concealment processing (step S19).

In case the data received from the encoded data extracting circuit 512 is speech encoded data and no generation request signal has been output just before, the second decision circuit 513 does not receive the signal to the effect that acquisition of the speech encoded data has failed. In case the acquisition of the speech encoded data has met with success (YES branching of the step S17), the second decision circuit outputs the speech encoded data to the second selection circuit 514.

In case the generation request signal has been output at the time of previous decision (YES branch of the step S18), and the speech encoded data received for the present time is the speech encoded data which should inherently be processed at an output timing of the generation request signal, the second decision circuit 513 discards the encoded speech signal. The second decision circuit outputs a re-acquisition request signal to the encoded data extracting circuit 512 in order to make a request for speech encoded data a second time (step S20).

In the present embodiment, it is necessary to avoid such a case in which the discarding request signal and the re-acquisition request signal are generated alternately in a repeated fashion thus leading to continuous outputting of the data from the second encoded data extracting circuit 515 to the data multiplexing circuit 900. Thus, the second decision circuit 513 includes a resetting function for avoiding this case from occurring.

The second selection circuit 514 acquires the speech encoded data or the generation request signal, supplied from the second decision circuit 513. In case the signal received from the second decision circuit 513 is the generation request signal, the second selection circuit 514 selects the second encoded data extracting circuit 515, so that the speech encoded data, generated by the second encoded data extracting circuit 515, is output to the data multiplexing circuit (step S22).

If conversely the encoded speech signal has been received, the second selection circuit 514 selects the processing of outputting the speech encoded data to the data multiplexing circuit 900 (step S23).

The second encoded data extracting circuit 515 generates encoded data for causing a destination terminal of transmission on the line-switched network side, not shown, to execute error concealment processing.

As a result of the above-described sequence of operations, acceptable speech delay may be maintained of the multiplexed data, sent out over the data multiplexing circuit 900 and the first timer circuit 1000, as the deterioration in the speech quality is suppressed to a minimum. It should be noted that the configuration of the speech data processing circuit 550 is merely illustrative and any suitable configuration other than that described above may be used provided that it is capable of achieving equivalent processing.

The above-described embodiment refers to a case where the packet-switched network and the line-switched network use the same speech encoding system. However, the present invention may be applied to a case where the packet-switched network and the line-switched network use different speech encoding systems.

The case where the packet-switched network and the line-switched network use different speech encoding systems will now be described by way of a second embodiment of the present invention. The present embodiment includes a speech data processing circuit 560 in place of the speech data processing circuit 550 in FIG. 1.

Figure 6:
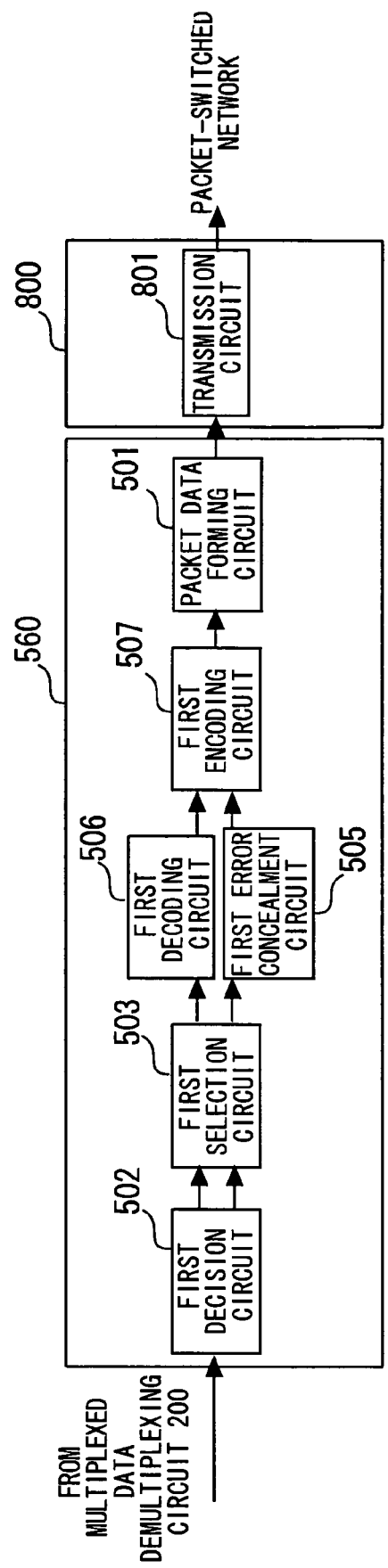
FIG. 6 is a diagram showing the configuration relevant to processing in a direction from a line-switched network to a packet-switched network in a speech data processing circuit in a second embodiment of the present invention.
Figure 7:
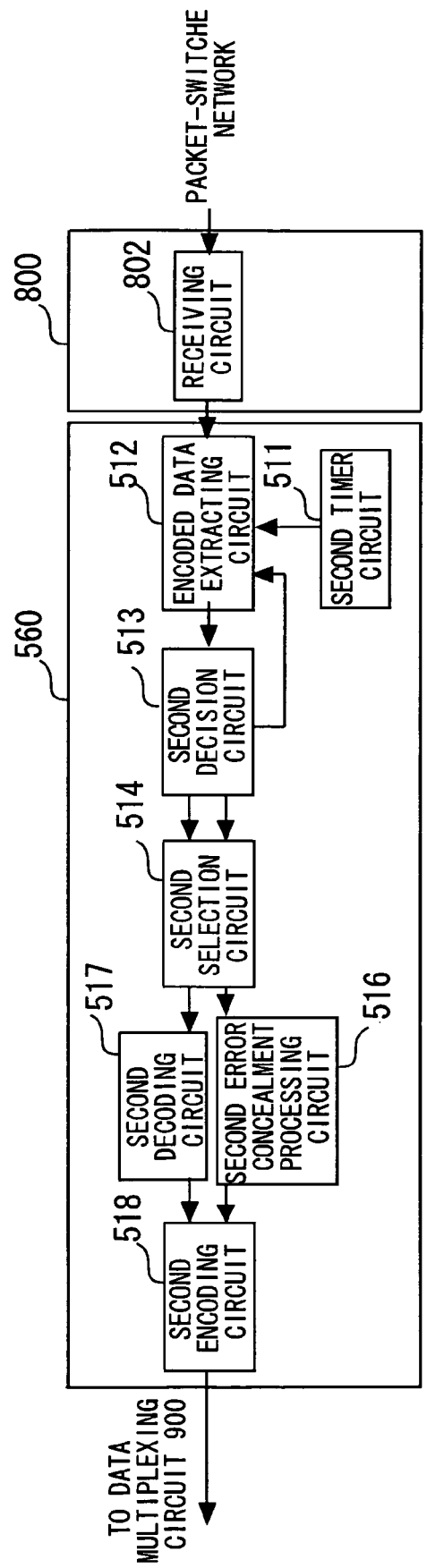
FIG. 7 is a diagram showing the configuration relevant to processing in a direction from the packet-switched network to the line-switched network in the speech data processing circuit in the second embodiment of the present invention.

FIGS. 6 and 7 are diagrams showing the configurations of the speech data processing circuit 560 in the second embodiment of the present invention.

Referring to FIG. 6, the speech data processing circuit 560 for the case where the packet-switched network and the line-switched network use different speech encoding systems includes, in a direction from the packet-switched network to the line-switched network, a packet data forming circuit 501, a first decision circuit 502, a first selection circuit 503, a first error concealment circuit 505, a first decoding circuit 506 and a first encoding circuit 507.

On receipt of the speech encoded data from the multiplexed data demultiplexing circuit 200, the first decision circuit 502 counts the number of the speech encoded data and calculates the acquired number of the speech encoded data output at every period. The first decision circuit compares the so calculated number to the number of the speech encoded data expected to be output from the multiplexed data demultiplexing circuit 200 per period in accordance with the period and the speech encoding system. It should be noted that this number of the speech encoded data expected is the expected value pre-calculated and stored. In case the acquired number of the speech encoded data output per period is coincident with the expected value, all of the speech encoded data, output from the multiplexed data demultiplexing circuit 200 per period, are output to the first selection circuit 503. In the acquired number of the speech encoded data output per period is less than the expected value, the first decision circuit outputs to the first selection circuit 503 the speech encoded data actually acquired and, together with it, a generation request signal to the effect that a number in deficit of the speech PCM data shall be generated in the first error concealment circuit 505. In the acquired number of the speech encoded data output per period exceeds the expected value, the first decision circuit outputs a discarding request signal to the effect that the number of the speech encoded data in excess shall be discarded, to the first selection circuit 503, along with the speech encoded data actually acquired.

On receipt of the generation request signal, along with the speech encoded data, from the first decision circuit 502, the first selection circuit 503 causes a number of speech PCM data equal to the number indicated by the generation request signal to be generated by the first error concealment circuit 505. On receipt of the discarding request signal, along with the speech encoded data, from the first decision circuit 502, the first selection circuit 503 discards a number of the speech encoded data corresponding to the number indicated by the discarding request signal, and sends only the speech encoded data, left over, to the first decoding circuit 506.

The first decoding circuit 506 decodes the speech encoded data, supplied form the first selection circuit 503, to output the speech PCM data.

The first error concealment circuit 505 outputs the speech PCM data by error concealment processing.

The first encoding circuit 507 acquires the speech PCM data from the first decoding circuit 506 and the first error concealment circuit 505 and encodes the data in accordance with a different encoding system to output the resulting encoded data.

The packet data forming circuit 501 converts the speech encoded data, output from the first encoding circuit 507, into data of the packet data format, by way of protocol conversion, to output the resulting packet data to the packet-switched network terminating circuit 800.

Referring to FIG. 7, the speech data processing circuit 560 includes, in the direction from the packet-switched network to the line-switched network, a second timer circuit 511, an encoded data extracting circuit 512, a second decision circuit 513, a second error concealment processing circuit 516, a second decoding circuit 517 and a second encoding circuit 518, and fulfils a transcoder processing function.

The second timer circuit 511 outputs a processing start request signal at a constant period.

On receipt of the processing start request signal from the second timer circuit 511, or the re-acquisition signal from the second decision circuit 513, the encoded data extracting circuit 512 makes a trial to get suitable speech data from the receiving circuit 802. If the trial has met with success, the encoded data extracting circuit extracts the encoded data to output the so extracted data. If the trial in acquiring the speech data has failed, the encoded data extracting circuit outputs a signal to the effect that the trial for acquisition has failed.

On receipt of the signal from the encoded data extracting circuit 512 to the effect that acquisition has failed, the second decision circuit 513 outputs a generation request signal of selecting the second error concealment processing circuit 516. In case the data received from the encoded data extracting circuit 512 is the speech encoded data, and no generation request signal has been output just before, the second decision circuit 513 outputs the speech encoded data to the second selection circuit 514. In case the generation request signal has been output at the time of a directly previous decision, and the presently acquired speech encoded data is the encoded data which should have been processed at an output timing of the generation request signal, the second decision circuit 513 outputs to the second selection circuit 514 the speech encoded data and, together with it, a discarding request signal to the effect that the encoded speech signal shall be discarded. The second decision circuit outputs a re-acquisition signal to the encoded data extracting circuit 512 in order to request speech encoded data again.

In case of receipt of the generation request signal from the second decision circuit 513, the second selection circuit 514 selects the second error concealment processing circuit 516. In case of receipt of the speech encoded data from the second decision circuit 513, the second selection circuit outputs the speech encoded data to the second decoding circuit 517.

The second error concealment processing circuit 516 outputs the speech PCM data by error concealment processing. The second decoding circuit 517 decodes the speech encoded data, supplied from the second decision circuit 513, to output resulting speech PCM data.

The second encoding circuit 518 acquires the speech PCM data, from the second error concealment processing circuit 516 or the second decoding circuit 517, and encodes the so acquired speech PCM data in accordance with the encoding system as used in the destination of transmission. The second encoding circuit outputs the resulting speech encoded data to the data multiplexing circuit 900.

Figure 8:
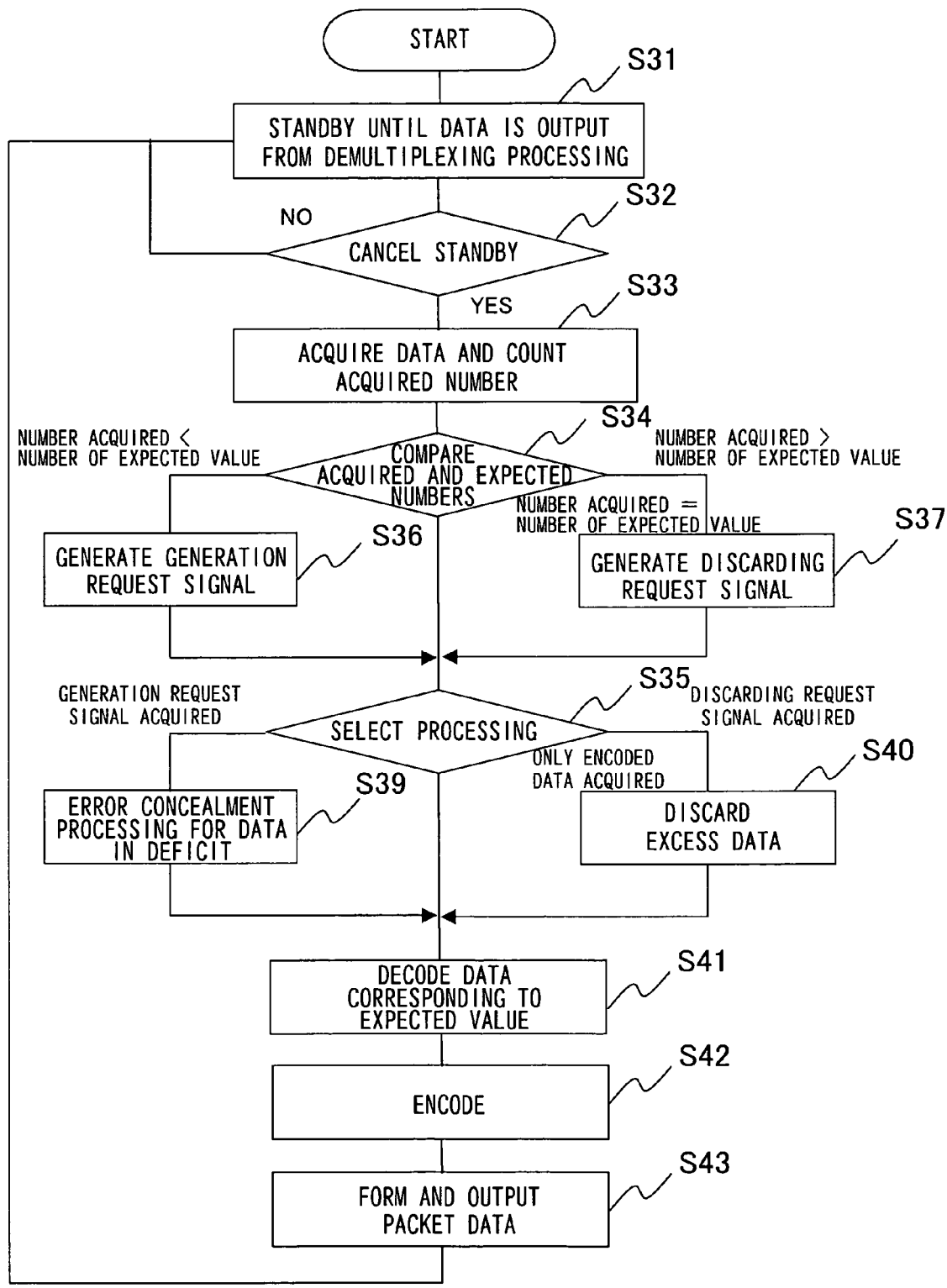
FIG. 8 is a flowchart for illustrating the processing for the direction from the line-switched network to the packet-switched network in the speech data processing circuit in the second embodiment of the present invention.

FIG. 8 is a flowchart for illustrating the operation for the direction from the line-switched network to the packet-switched network for the case where the speech encoding systems used by the two communication networks differ from each other. Referring to FIGS. 1, 6 and 8, the operation of the speech data processing circuit 560 will be described.

The first decision circuit 502 of the speech data processing circuit 560 of FIG. 6 receives speech encoded data, obtained on demultiplexing from the multiplexed data in the multiplexed data demultiplexing circuit 200, and supplied to the speech data processing circuit 560. The first decision circuit 502 also counts up the number of speech encoded data, output at every period (steps S31 to S33). The first decision circuit 502 has already pre-calculated the number of speech encoded data, expected to be output from the multiplexed data demultiplexing circuit 200 at every period. The first decision circuit 502 compares the two numbers to each other (step S34).

In case the number of the speech encoded data, output per period, is coincident with the number of the speech encoded data, expected to be output from the multiplexed data demultiplexing circuit 200 per period, the first decision circuit 502 outputs all of the speech encoded data, output from the multiplexed data demultiplexing circuit 200 per period, to the first selection circuit 503.

When the number of the speech encoded data, output at every period, is less than the number of the speech encoded data, expected to be acquired per period, the first decision circuit 502 outputs a generation request signal to the effect that a number in deficit of the speech PCM data shall be generated in the first error concealment circuit 505, to the first selection circuit 503, along with the encoded speech signal actually acquired (step S36).

In case the number acquired of the speech encoded data, output per period, exceeds the number of the speech encoded data, expected to be output per period from the multiplexed data demultiplexing circuit 200, the first decision circuit 502 outputs a discarding request signal to the purport that the speech encoded data in excess shall be discarded, along with the encoded speech signal actually acquired (step S37).

The first selection circuit 503 receives speech encoded data and, together with it, the generation request signal or the discarding request signal, as the case may be, from the first decision circuit 502.

If only the speech encoded data has been acquired from the first decision circuit 502, the first selection circuit 503 outputs all of the speech encoded data to the first decoding circuit 506.

In case the first selection circuit 503 has received the encoded speech signals, along with the generation request signal, from the first decision circuit 502, the first selection circuit 503 causes the first error concealment circuit 505 to generate a number of the speech PCM data, corresponding to the number indicated by the generation request signal (step S39).

The first selection circuit 503 sends the speech encoded data, received from the first decision circuit 502, to the first decoding circuit 506. The speech PCM data from the first error concealment circuit 505 is entered, along with the decoded data, output from the first decoding circuit 506, to the first encoding circuit 507.

The first error concealment circuit 505 is a circuit for outputting speech PCM data by error concealment processing. It should be noted that the error concealment processing by the first error concealment circuit 505 may be a method of using duplicated data of directly previous speech signal or a method of using error concealment processing provided in the speech encoding system applied.

On receipt of the discarding request signal, along with the speech encoded data, the first selection circuit 503 discards a number of the speech encoded data, corresponding to the number indicated by the discarding request signal, out of the speech encoded data received (step S40), and sends the speech encoded data, left over, to the first decoding circuit 506.

The first decoding circuit 506 decodes the speech encoded data, supplied from the first selection circuit 503, to output the so decoded data as speech PCM data.

The first encoding circuit 507 receives the speech PCM data, output from the first decoding circuit 506 and the first error concealment circuit 505, and encodes the speech PCM data in a manner matched to the destination of transmission, to output the resulting encoded speech signals (step S42).

The packet data forming circuit 501 receives the speech encoded data, output from the first encoding circuit 507, and converts the speech encoded data into data of the packet format to output the resulting packet data to the packet-switched network terminating circuit 800 (step S43).

Thus, in the present second embodiment of the present invention, a number of the packet data, matched to the period, is similarly sent out from the transmission circuit 801 of the packet-switched network terminating circuit 800, as a result of the above-described sequence of operations.

Figure 9:
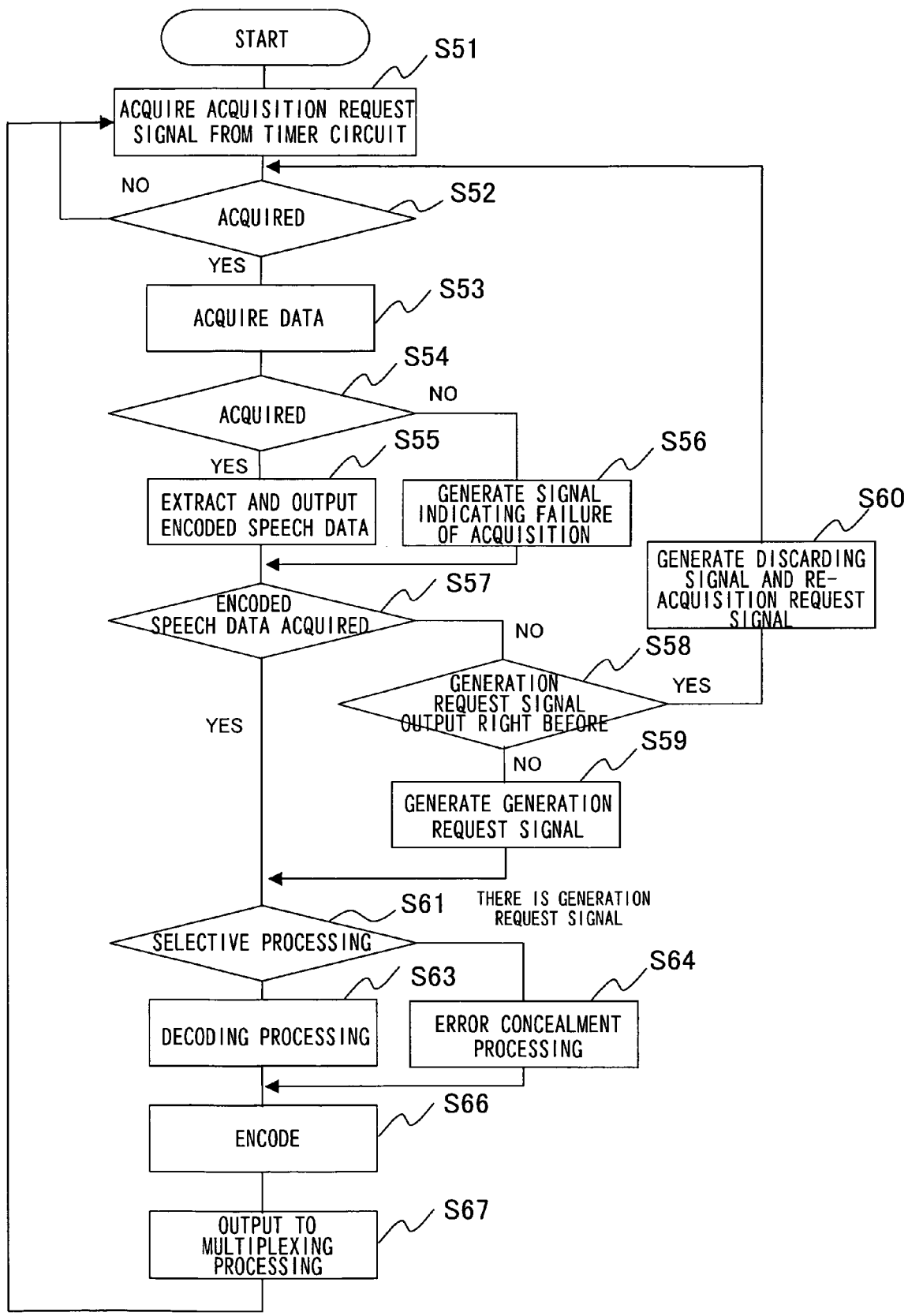
FIG. 9 is a flowchart for illustrating the processing for the direction from the packet-switched network to the line-switched network in the speech data processing circuit in the second embodiment of the present invention.

FIG. 9 depicts a flowchart for illustrating the operation for the direction from the packet-switched network to the line-switched network. The operation of the speech data processing circuit 560 will now be described with reference to FIGS. 1, 7 and 8.

The encoded data extracting circuit 512 acquires the processing start request signal, output at a preset period from the second timer circuit 511, or the re-acquisition request signal from the second decision circuit 513, and makes a trial to get suitable speech data from the receiving circuit 802 (step S51 to S53). In case the trial to get the speech data has met success, the encoded data extracting circuit extracts the encoded data to output the so extracted data (step S55). In case the trial to get the speech data has failed, the encoded data extracting circuit generates and output a signal indicating that the speech data has failed to be acquired (step S56).

The second decision circuit 513 receives, from the encoded data extracting circuit 512, the speech encoded data or the signal to the effect that acquisition has failed. In case the signal received from the encoded data extracting circuit 512 is the signal to the effect that acquisition has failed, the second decision circuit 513 outputs a generation request signal for selecting the second error concealment processing circuit 516 (step S59). In outputting the generation request signal in case the signal received from the encoded data extracting circuit 512 is the signal to the effect that acquisition has failed, the second decision circuit 513 is acting on the assumption that the input/output balance of the buffer provided to the receiving circuit 802 has been upset due to delay fluctuations of the packet-switched network or that packet loss has occurred in the packet-switched network such that suitable speech data has failed to be acquired.

If the data acquired by the second decision circuit 513 is the speech encoded data and the second decision circuit has output no generation request signal right before (YES branch of the step S57), the second decision circuit outputs the speech encoded data to the second selection circuit 514.

If the second decision circuit 513 has issued the generation request signal at the time of the previous decision, and the speech encoded data, currently acquired, is the encoded data which should have been processed at an output timing of the generation request signal, a discarding request signal, indicating that the speech encoded data should be discarded, is output, along with the speech encoded data, to the second selection circuit 514. The second decision circuit 513 outputs a re-acquisition request signal to the encoded data extracting circuit 512, for requesting the speech encoded data again (step S60).

It is necessary to avoid such a case in which the discarding request signal and the re-acquisition request signal are generated alternately in a repeated fashion thus leading to continuous outputting of the speech encoded data which are obtained from the second encoding circuit 518 from the speech PCM data from the second error concealment processing circuit 516. Thus, the second decision circuit 513 includes a resetting function for avoiding this case from occurring.

The second selection circuit 514 acquires the speech encoded data and, together with it, the generation request signal or the discarding request signal, supplied from the second decision circuit 513. In case the signal received from the second decision circuit 513 is the generation request signal, the second selection circuit 514 selects the second error concealment processing circuit 516. In case the signal received from the second decision circuit 513 is the speech encoded data, the second selection circuit outputs the speech encoded data to the second decoding circuit 517.

The second error concealment processing circuit 516 outputs speech PCM data by error concealment processing (step 64).

The second decoding circuit 517 decodes the speech encoded data supplied from the second decision circuit 513 to output speech PCM data (step 65).

As for the processing in the second error concealment processing circuit 516, similarly to that in the first error concealment circuit 505, any suitable known techniques, such as a method of using directly previous speech data or a method of using error concealment processing provided in the speech encoding system applied, may be used.

The second encoding circuit 518 acquires the speech PCM data from the second error concealment processing circuit 516 or the decoding circuit 517 and executes encoding (step S66). The second encoding circuit 518 then outputs the resulting speech encoded data to the data multiplexing circuit 900.

The operation of the downstream side components, that is, the data multiplexing circuit 900 and the line-switched network terminating circuit, is similar to that of the first embodiment, and hence is dispensed with. The above-described sequence of operations accounts for the operation of the present invention for the different speech encoding systems.

Figure 10:
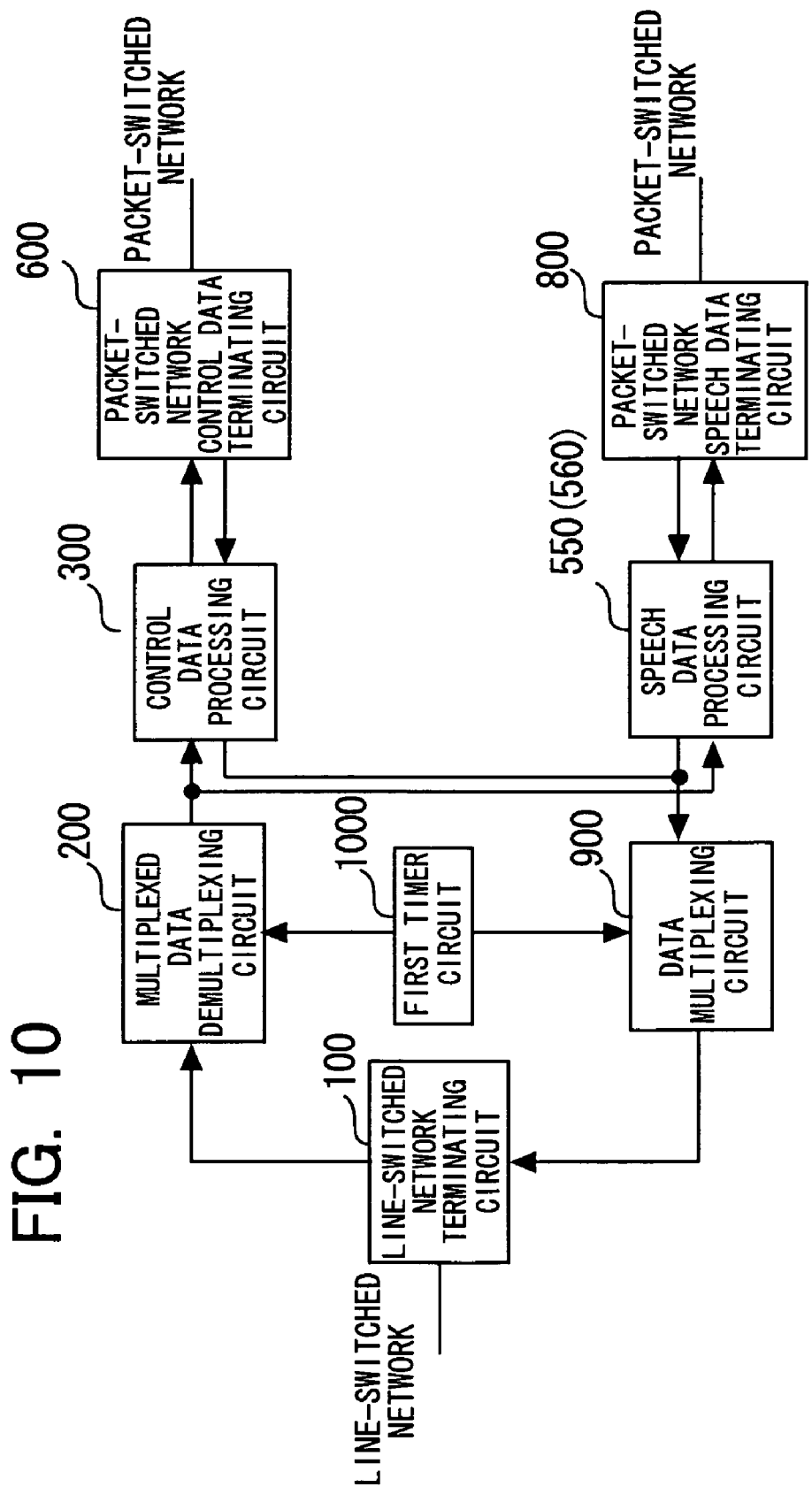
FIG. 10 is a diagram showing the configuration of a gateway apparatus according to a third embodiment of the present invention.

It should be noted that the circuit configuration for the processing method for speech encoded data is merely illustrative such that equivalent operations may also be achieved by other circuit configurations The above-described embodiment has been described on the basis of the gateway apparatus having the functions of processing the speech and the images. However, the present invention is not to be limited to this configuration. For example, the present invention may be applied to a gateway apparatus adapted for only speech communication. FIG. 10 shows the configuration of a third embodiment of the present invention. The configuration of the gateway apparatus, shown in FIG. 10, is the configuration of FIG. 1 from which the image data processing circuit 400 and the packet-switched network image data terminating circuit 700 are removed. The multiplexed data demultiplexing circuit 200 demultiplexes the received data into control data and speech data which are supplied to a control data processing circuit 300 and to a speech data processing circuit 550 (560), respectively. The data multiplexing circuit 900 outputs data, multiplexed from the control data from the control data processing circuit 300, and the speech data from the speech data processing circuit 550 (560), to the line-switched network terminating circuit 100. In other respects, the present embodiment is similar in configuration and operation to the above-described first or second embodiment and hence the explanation is dispensed with.

In the present embodiment, described above, insofar as the direction from the line-switched network to the packet-switched network is concerned, the number of the speech encoded data actually acquired from the multiplexed data demultiplexing circuit 200 operating at a preset period per period is compared to the number of speech encoded data expected to be output per period from the multiplexed data demultiplexing circuit 200 per period as calculated from the period and the frame time duration of the speech encoding system of interest. Based on the result of comparison, suitable decision processing is carried out and the processing for generating encoded data or the discarding processing is selected by selecting processing. This renders it possible to provide for a constant number of speech packet data per period and to maintain short delay for speech communication as deterioration of the speech quality in the destination terminal of transmission is suppressed to a minimum.

In the present embodiment, if, in the direction from the packet-switched network to the line-switched network, packet delay is caused by delay fluctuations in the packet-switched network is produced, an output indicating that speech data has failed to be acquired is output from the encoded data extraction processing to carry out proper decision. By selective processing, the processing for generating encoded data is selected, or discarding processing is carried out, whereby the same meritorious effects as those for the direction from the line-switched network to the packet-switched network may be achieved. Moreover, with the present embodiment, short signal delay may be attained as deterioration in the signal quality is suppressed. It should be noted that, while the present invention is applied with advantage to interconnection of the line-switched network and the packet-switched network, the present invention may also be applied to interconnection of other different types of the networks. Although the present invention has so far been described with reference to the preferred embodiments, the present invention is not limited to the particular configurations of these embodiments. It will be appreciated that the present invention may encompass various changes or corrections such as may readily be arrived at by those skilled in the art within the scope and the principle of the invention.

The invention claimed is:

1. A gateway apparatus for conducting connection between a first communication network and a second communication network of respective different types, said apparatus comprising:
   decision means for deciding on whether data from at least one of said first and second communication networks has been delayed in arrival or lost based on at least one of the following events (i) and (ii):
   (i) comparing the number of encoded data actually acquired in a preset period and the number of encoded data expected to be acquired in said period, and determining that data has been delayed in arrival or lost when there is a difference between the number of data acquired and the number of data expected to be acquired, and
   (ii) attempting to acquire the encoded data in a preset period and, when the attempt to acquire encoded data has failed, determining that the data has been delayed in arrival or lost, wherein the acquired data is the same as the data acquired in a previous period; and
   control means for performing control so that, if the result of said decision indicates that the data from at least one of said first and second communication networks has been delayed in arrival or lost, data for causing a destination terminal of transmission on the other communication network to execute error concealment processing is generated when the number of data actually acquired is less than the number of data expected to be acquired or data acquired is discarded when the number of data actually acquired exceeds the number of data expected to be acquired.

2. The gateway apparatus according to claim 1 wherein said first communication network is a line-switched network; and
said second communication network is a packet-switched network; and wherein
said apparatus comprises:
first decision means for deciding on whether encoded data from said line-switched network has been delayed in arrival or lost; and
first control means for performing control so that, if the result of said decision indicates that said encoded data has been delayed in arrival or lost, encoded data for causing a destination terminal of transmission on said packet-switched network to execute error concealment processing is generated when the number of data actually acquired is less than the number of data expected to be acquired or the encoded data acquired is discarded when the number of data actually acquired exceeds the number of data expected to be acquired.

3. The gateway apparatus according to claim 2, wherein said decision means comprises:
second decision means for deciding on whether encoded data from said packet-switched network has been delayed in arriving or lost; and
second control means for performing control so that, if the result of said decision indicates that the encoded data from said line-switched network has been delayed in arrival or lost, encoded data for causing a destination terminal of transmission on the side of said line-switched network to execute error concealment processing is generated when the number of data actually acquired is less than the number of data expected to be acquired, or the encoded data delayed in arrival is discarded when the number of data actually acquired exceeds the number of data expected to be acquired.

4. The gateway apparatus according to claim 1, wherein said first communication network is a line-switched network; and
said second communication network is a packet-switched network; and wherein
said decision means comprises:
second decision means for deciding on whether encoded data from said packet-switched network has been delayed in arriving or lost; and
second control means for performing control so that, if the result of said decision indicates that the encoded data from said line-switched network has been delayed in arrival or lost, encoded data for causing a destination terminal of transmission on the side of said line-switched network to execute error concealment processing is generated when the number of data actually acquired is less than the number of data expected to be acquired, or the encoded data delayed in arrival is discarded when the number of data actually acquired exceeds the number of data expected to be acquired.

5. A gateway apparatus for conducting connection between a first communication network and a second communication network of respective different types, said apparatus comprising:
second decision means for deciding on whether the encoded data from a packet-switched network has been delayed in arrival or lost;
second control means for performing control so that, if the result of decision indicates that the encoded data from said line-switched network has been delayed in arrival or lost, data is generated by error concealment processing when the number of data actually acquired is less than the number of data expected to be acquired, or the acquired encoded data is discarded when the number of data actually acquired exceeds the number of data expected to be acquired;

second decoding means for decoding the encoded data from said packet-switched network, as processed by said second control means, and for outputting the resulting decoded data; and second encoding means for encoding the data obtained from said error concealment processing from said second control means and said decoded data from said second decoding means in accordance with an encoding system different from the encoding system for said encoded data from said packet-switched network, wherein said first communication network is a line-switched network, and wherein said second communication network is said packet-switch network.

6. A gateway apparatus for conduction between a first communication network and a second communication network of respective different types, said apparatus comprising:

first decision means for deciding on whether the encoded data from a line-switched network has been delayed in arrival or lost;

first control means for performing control so that, if the result of decision indicates that the encoded data from said line-switched network has been delayed in arrival or lost, data is generated by error concealment processing when the number of data acquired is less than the number of data expected to be acquired, or the acquired encoded data is discarded when the number of data acquired exceeds the number of data expected to be acquired;

first decoding means for decoding the encoded data from said line-switched network, as processed by said first control means, and for outputting the resulting decoded data;

first encoding means for encoding the data obtained from said error concealment processing from said first control means and said decoded data from said first decoding means in accordance with an encoding system different from the encoding system for said encoded data from said line-switched network;

second decision means for deciding on whether the encoded data from a packet-switched network has been delayed in arrival or lost;

second control means for performing control so that, if the result of decision indicates that the encoded data from said packet-switched network has been delayed in arrival or lost, data is generated by error concealment processing when the number of data acquired is less than the number of data expected to be acquired, or the acquired encoded data is discarded when the number of data acquired exceeds the number of data expected to be acquired;

second decoding means for decoding the encoded data from said packet-switched network, as processed by said second control means, and for outputting the resulting decoded data; and second encoding means for encoding the data obtained from said error concealment processing from said second control means and said decoded data from said second decoding means in accordance with an encoding system different from the encoding system for said encoded data from said packet-switched network, wherein said first communication network is said line-switched network, and wherein said second communication network is said packet-switch network.

7. A method for processing encoded data by a gateway apparatus for conducting connection between a first communication network and a second communication network of respective different types, said method comprising:

(a) a step of said gateway apparatus deciding on whether data from at least one of said first and second communication networks has been delayed in arriving or lost based on at least one of the following events (i) and (ii):

(i) comparing the number of encoded data actually acquired in a preset period and the number of encoded data expected to be acquired in said period, and determining that data has been delayed in arrival or lost when there is a difference between the number of data acquired and the number of data expected to be acquired, and (ii) attempting to acquire the encoded data in a preset period and, when the attempt to acquire encoded data has failed, determining that the data has been delayed in arrival or lost, wherein the acquired data is the same as the data acquired in a previous period; and (b) a step of said gateway apparatus generating data for causing a destination terminal of transmission to execute error concealment processing when the number of data actually acquired is less than the number of data expected to be acquired or discarding encoded data acquired when the number of data actually acquired exceeds the number of data expected to be acquired, in case the result of said decision indicates that data from at least one of said first and second communication networks has been delayed in arrival or lost.

8. The method for processing encoded data by a gateway apparatus according to claim 7, wherein said first communication network is a line-switched network and said second communication network is a packet-switched network; said method further comprising:

(a1) a step of said gateway apparatus deciding on whether encoded data from said line-switched network has been delayed in arrival or lost; and (b1) a step of said gateway apparatus generating encoded data for causing a destination terminal of transmission to execute error concealment processing when the number of data actually acquired is less than the number of data expected to be acquired or discarding encoded data acquired when the number of data actually acquired exceeds the number of data expected to be acquired in case the result of said decision indicates that data from said line-switched network has been delayed in arrival or lost.

9. The method for processing encoded data by a gateway apparatus according to claim 8, wherein said first communication network is a packet-switched network and said second communication network is a line-switched network; said method further comprising:

(a2) a step of said gateway apparatus deciding on whether encoded data from said packet-switched network has been delayed in arrival or lost; and (b2) a step of said gateway apparatus generating data for causing a destination terminal of transmission to execute error concealment processing when the number of data actually acquired is less than the number of data expected to be acquired or discarding encoded data acquired when the number of data actually acquired exceeds the number of data expected to be acquired, in case the result of said decision indicates that the encoded data from said packet-switched network has been delayed in arrival or lost.

10. The method for processing encoded data by a gateway apparatus according to claim 7, wherein said first communication network is a packet-switched network and said second communication network is a line-switched network; said method further comprising:

(a2) a step of said gateway apparatus deciding on whether encoded data from said packet-switched network has been delayed in arrival or lost based on at least one of the following events (i) and (ii):

(i) comparing the number of encoded data actually acquired in a preset period and the number of encoded data expected to be acquired in said period, and determining that data has been delayed in arrival or lost when there is a difference between the number of data acquired and the number of data expected to be acquired, and (ii) attempting to acquire the encoded data in a preset period and, when the attempt to acquire encoded data has failed, determining that the data has been delayed in arrival or lost, wherein the acquired data is the same as the data acquired in a previous period; and (b2) a step of said gateway apparatus generating data for causing a destination terminal of transmission to execute error concealment processing when the number of data actually acquired is less than the number of data expected to be acquired or discarding encoded data acquired when the number of data actually acquired exceeds the number of data expected to be acquired, in case the result of said decision indicates that the encoded data from said packet-switched network has been delayed in arrival or lost.

11. A method for processing encoded data by a gateway apparatus for conducting connection between a first communication network and a second communication network of respective different types, said method comprising:

(a1) a step of said gateway apparatus deciding on whether encoded data from a line-switched network has been delayed in arrival or lost; and (b1) a step of said gateway apparatus generating data by error concealment processing when the number of data acquired is less than the number of data expected to be acquired or discarding encoded data acquired when the number of data acquired exceeds the number of data expected to be acquired, in case the result of said decision indicates that the encoded data from said line-switched network has been delayed in arriving or lost;

(c1) a step of said gateway apparatus decoding encoded data from said line-switched network, processed in said step (b1) and outputting the resulting decoded data; and (d1) a step of said gateway apparatus encoding the data obtained by said error concealment processing and said decoded data in accordance with an encoding system different from that for encoded data from said line-switched network and outputting the resulting data, wherein said first communication network is said line-switched network; and wherein said second communication network is a packet-switched network.

12. A method for processing encoded data by a gateway apparatus for conducting connection between a line-switched network and a packet-switched network, wherein a data processing circuit for receiving and processing data output from a multiplexed data demultiplexing circuit demultiplexing multiplexed data from said line-switched network for outputting packet data via transmission circuit to said packet-switched network, includes:

(A1) a step of receiving and counting encoded data output from said multiplexed data demultiplexing circuit demultiplexing multiplexed data received from said line-switched network and comparing the number of the encoded data acquired per period with an expected value, that is, the number of encoded data expected to be output per period from said multiplexed data demultiplexing circuit;

(A2) a step of outputting, if the result of comparison indicates that the number of the encoded data acquired is equal to the number of said expected value, the encoded data received from said multiplexed data demultiplexing circuit;

outputting, if said result of comparison indicates that the number of the encoded data acquired is less than the number of said expected value, a generation request signal for generating data in deficit, along with said encoded data acquired; and outputting, if said result of comparison indicates that the number of the encoded data acquired is greater than the number of said expected value, a discarding request signal for discarding the encoded data in excess, along with said encoded data acquired;

(A3) a step of outputting said encoded data unchanged if, as a result of decision of the above step (A2), only said encoded data has been output;

giving a command to create data in deficit if said generation request signal has been output; and discarding, in case of receipt of said discarding request signal, a number of received encoded data indicated by the number indicated by said discarding request signal, and outputting the remaining portions of the encoded data;

(A4) a step of generating encoded data for causing a destination terminal of transmission to execute error concealment processing, in case said step (A3) has output a command for formulating data in deficit; and (A5) a step of converting the encoded data output from said step (A3) or the encoded data for error concealment processing, output from said step (A4), into packet data, and outputting the resulting packet data to said transmission circuit.

13. A method for processing encoded data by a gateway apparatus for conducting connection between a line-switched network and a packet-switched network, wherein a data processing circuit for receiving packet data from a receiving circuit receiving packet data from said packet-switched network, for extracting encoded data and for outputting the encoded data extracted, to said line-switched network via a data multiplexing circuit, includes:

(B1) a step of making a trial to get packet data from said receiving circuit at a time moment of receipt of a processing start request signal output from a timer at a preset period, or a re-acquisition request signal, extracting encoded data from said packet data if said attempt of acquiring packet data from said receiving circuit has met with success, and outputting a signal to the effect that packet data has failed to be acquired if said trial has failed;

(B2) a step of outputting a generation request signal for having a terminal of the destination of the line-switched network execute error concealment processing in case a signal to the effect that packet data has failed to be acquired has been output from said encoding data extracting processing of said step (B1), outputting the encoded data received from said encoded data extracting processing, if encoded data has been output from said encoded data extracting processing and no generation request signal has been output right before, outputting, if the result of decision for the present indicates that said generation request signal has been output and the encoded data output from the encoded data extracting circuit processing is the encoded data which should be processed at an output timing of said generation request signal, a discarding request signal, along with said encoded data, said discarding request signal indicating that said encoded data shall be discarded, and outputting a re-acquisition request signal for requesting again encoded data to said encoded data extracting processing;

(B3) a step of outputting, if encoded data only has been output from said step (B2), said encoded data output;

issuing a command to execute encoded data extracting processing if the generation request signal has been output from said step (B2), and deleting only relevant portions of said encoded data if the discarding request signal has been output from said step (B2), and outputting remaining portions of the encoded data;

(B4) a step of generating encoded data needed for a destination terminal of transmission on the line-switched network to execute error concealment processing; and (B5) a step of sending the encoded data, output from said step (B3), or the encoded data, output from said step (B4), via said multiplexed data demultiplexing circuit to said line-switched network.

14. A method for processing encoded data by a gateway apparatus for conducting connection between a line-switched network and a packet-switched network and re-encoding input encoded data in accordance with another encoding system to output the resulting re-encoded data, wherein a data processing circuit packetizing data obtained on re-encoding encoded data of the first encoding system, demultiplexed by said multiplexed data demultiplexing circuit, in accordance with another encoding system, and outputting the resulting packetized data via a transmission circuit to said packet-switched network, includes:

(A1) a step of receiving and counting encoded data output from said multiplexed data demultiplexing circuit and comparing the number of the encoded data acquired per period with an expected value, that is, the number of encoded data expected to be output per period from said multiplexed data demultiplexing circuit, (A2) a step of outputting, if the result of comparison indicates that the number of the encoded data acquired is equal to the number of said expected value, the encoded data received from said multiplexed data demultiplexing circuit;

outputting, if said result of comparison indicates that the number of the encoded data acquired is less than the number of said expected value, a generation request signal for generating data in deficit; and outputting, if said result of comparison indicates that the number of the encoded data acquired is greater than the number of said expected value, a discarding request signal for discarding the encoded data in excess;

(A3) a step of outputting said encoded data if, as a result of decision of the step (A2), only said encoded data has been output;

giving a command to create data in deficit if said generation request signal has been output from said step (A2); and discarding, in case of receipt of said discarding request signal from said step (A2), a number of received encoded data corresponding to the number indicated by said discarding request signal, and outputting the remaining portions of the encoded data;

(A4) a step of decoding the encoded data output from said step (A3) and outputting the resulting decoded step; a step of (A5) a step of outputting encoded data of an amount indicated by said generation request signal, said encoded data generated by error concealment processing, based on a command output from said step (A3);

(A6) a step of encoding the decoded data generated by said step (A4) or the data generated in said step (A5), in accordance with said second encoding system, to output resulting data; and (A7) a step of converting the data, encoded with said second encoding system, into packet data and outputting the resulting packet data to said transmission circuit.

15. A method for processing encoded data by a gateway apparatus for conducting connection between a line-switched network and a packet-switched network and re-encoding input encoded data in accordance with another encoding system to output the resulting re-encoded data, wherein a data processing circuit receiving packet data from a receiving circuit receiving packet data from said packet-switched network, extracting encoded data encoded in accordance with a second encoding system, re-encoding the extracted encoded data with a second encoding system, and outputting the resulting re-encoded data via data multiplexing circuit to said line-switched network, includes:

(B1) a step making a trial to get packet data from said receiving circuit at a time moment of receipt of a processing start request signal from a timer circuit, or of a re-acquisition request signal entered, and extracting the encoded data, encoded in accordance with said second encoding system, from said packet data, if said trial has met with success, and outputting a signal to the effect that packet data has failed to be acquired, if the trial of acquiring packet data from said receiving circuit has failed, by way of executing encoded data extracting processing;

(B2) a step of outputting a generation request signal for causing a destination terminal of transmission of the line-switched network to execute error concealment processing in case an signal to the effect that packet data has failed to be acquired is output from said encoded data extraction processing of said step (B1);

receiving the encoded data output from said encoded data extraction processing and outputting said encoded data received from said encoded data extracting processing if said encoded data extraction processing has failed to output said generation request signal right before; and outputting, if the result of previous decision indicates that the generation request signal has already been output from said encoded data extracting processing and the encoded data output from said encoded data extracting processing for the present is the encoded data which should be processed at an output timing of said generation request signal, said encoded signal and, together therewith, a discarding request signal indicating that said encoded data shall be discarded, and outputting a re-acquisition request signal for requesting again the encoded data to said encoded data extracting processing;

(B3) a step of outputting, if said encoded data only is output from said step (B2), said encoded data output;

issuing a command for executing error concealment processing if said generation request signal is output from said step (B2), and deleting relevant portions of the encoded data output, as the remaining portions of the encoded data is output, in case the discarding request signal has been output from said step (B2);

(B4) a step of outputting data by error concealment processing based on a command from said step (B3);

(B5) a step of decoding the encoded data output from the step (B3) to output the resulting decoded data;

(B6) a second encoding step of encoding the decoded data from said step (B5) or the data obtained by said error concealment processing of said step (B4) in accordance with the first encoding system on the destination of transmission, and outputting the resulting encoded data; and (B7) a step of sending the encoded data of said first encoding system via said data multiplexing circuit to said line-switched network.

16. A gateway apparatus for conducting connection between a line-switched network and a packet-switched network, comprising:

a controller which compares the number of encoded data actually acquired in a preset period from said line-switched network, with an expected value, that is, the number of encoded data expected to be acquired in said period, generates encoded data, if the result of comparison indicates that the number of the encoded data actually acquired is less than said expected value, and which discards excess portions of the encoded data acquired if the result of comparison indicates that the number of the encoded data actually acquired is greater than said expected value, such that a number of the encoded data equal to said expected value per period are packetized, for performing control to maintain constant the number of the packet data sent to said packet-switched network per period.

* * * * *